US010595185B1

(12) United States Patent
Chen et al.

(10) Patent No.: US 10,595,185 B1
(45) Date of Patent: Mar. 17, 2020

(54) CHANNEL DIVERSITY AWARENESS IN NEIGHBOR SELECTION

(71) Applicant: Amazon Technologies, Inc., Seattle, WA (US)

(72) Inventors: Xi Chen, San Jose, CA (US); Lori Yoshida, Santa Clara, CA (US); Avinash Joshi, San Jose, CA (US)

(73) Assignee: Amazon Technologies, Inc., Seattle, WA (US)

( * ) Notice: Subject to any disclaimer, the term of this patent is extended or adjusted under 35 U.S.C. 154(b) by 37 days.

(21) Appl. No.: 15/886,394

(22) Filed: Feb. 1, 2018

(51) Int. Cl.
H04L 12/28 (2006.01)
H04W 8/00 (2009.01)
H04W 72/12 (2009.01)
H04W 40/24 (2009.01)
H04L 5/00 (2006.01)
H04W 48/16 (2009.01)
H04L 29/08 (2006.01)
(Continued)

(52) U.S. Cl.
CPC ............ *H04W 8/005* (2013.01); *H04L 5/006* (2013.01); *H04W 40/244* (2013.01); *H04W 48/16* (2013.01); *H04W 72/12* (2013.01); *H04B 7/04* (2013.01); *H04L 67/104* (2013.01); *H04W 84/18* (2013.01)

(58) Field of Classification Search
CPC . H04W 24/02; H04W 40/12; H04W 52/0212; H04W 84/18; H04W 45/122; H04W 8/005; H04W 4/008; H04W 40/244; H04W 72/005; H04L 41/12; H04L 12/24
See application file for complete search history.

(56) References Cited

U.S. PATENT DOCUMENTS 10,129,731 B2 * 11/2018 Yoshida .................. H04L 5/006
10,219,142 B2 * 2/2019 Yoshida .................. H04B 7/04
(Continued)

FOREIGN PATENT DOCUMENTS

WO 2011/063182 A1 5/2011
WO 2015/138914 A1 9/2015
WO 2017/222706 A1 12/2017

OTHER PUBLICATIONS

International Search Report and Written Opinion dated Aug. 3, 2017, on application No. PCT/US2017/033662.
(Continued)

*Primary Examiner* — Hanh N Nguyen
(74) *Attorney, Agent, or Firm* — Lowenstein Sandler LLP

(57) ABSTRACT

Technology for neighbor selection with radio channel diversity awareness is described. In one embodiment, processing logic receives an RSSI value, a neighbor-sector identifier that identifies an antenna, and an unused channel list from each neighboring mesh network device. The processing logic generates a data structure with data in entries that are sorted according to an order of ascending or descending RSSI values. The processing logic performs a first search of the data structure to obtain a first set of radio channels for a first set of communication links and a second search to obtain a second set of radio channels for a second set of communication links. The processing logic determines that the second set of radio channels is higher than a second connectivity-quality metric value of the first set of radio channels and sends a neighbor pairing request to each neighboring mesh network device in the second set.

17 Claims, 15 Drawing Sheets

(51) Int. Cl.
　　　*H04B 7/04*　　　(2017.01)
　　　*H04W 84/18*　　(2009.01)

(56) References Cited

U.S. PATENT DOCUMENTS

| | | |
|---|---|---|
| 2006/0215624 A1 | 9/2006 | Adya et al. |
| 2009/0129323 A1 | 5/2009 | Chen et al. |
| 2010/0150077 A1 | 6/2010 | Nanda et al. |
| 2011/0199918 A1 | 8/2011 | Sampath et al. |
| 2013/0176960 A1 | 7/2013 | Franklin et al. |
| 2014/0056177 A1 | 2/2014 | Kneckt et al. |
| 2015/0223088 A1 | 8/2015 | Niu et al. |
| 2017/0079001 A1 | 3/2017 | Lewis |
| 2017/0086211 A1 | 3/2017 | Sahin et al. |
| 2017/0366956 A1 | 12/2017 | Yoshida et al. |

OTHER PUBLICATIONS

Das SM, Pucha H, Koutsonikolas D, Hu YC, Peroulis D. DMesh: incorporating practical directional antennas in multichannel wireless mesh networks. IEEE Journal on selected areas in communications. Nov. 2006;24(11):2028-39.

Choudhury RR, Vaidya NH. Performance of ad hoc routing using directional antennas. Ad Hoc Networks. Mar. 31, 2005;3(2):157-73.

International Search Report and Written Opinion dated Jul. 20, 2018, on application No. PCT/US2018/031407.

\* cited by examiner

300

| Sector ID | RSSI, Node-sector ID, Free Ch. |
|---|---|
| S0 | -62 with N1(S2, free channels) — 302 |
|  | -69 with N6(S3, free channels) — 304 |
| S1 | -60 with N1(S0, free channels) — 306 |
|  | -63 with N2(S2, free channels) — 308 |
| S2 | -55 with N3(S4, free channels) — 310 |
| S3 |  |
| S4 (up) | -65 with N4(S1, free channels) — 312 |
| S5 (down) | -63 with N5(S4, free channels) — 314 |

| Sector ID | RSSI, Node-sector ID, Free Ch. |
|---|---|
| S0 | ~~-62 with N1(S2, free channels)~~ |
|  | -69 with N6(S3, free channels) — 304 |
| S1 | -60 with N1(S0, free channels) — 306 |
|  | ~~-63 with N2(S2, free channels)~~ |
| S2 | -55 with N3(S4, free channels) — 310 |
| S3 |  |
| S4 (up) | -65 with N4(S1, free channels) — 312 |
| S5 (down) | -63 with N5(S4, free channels) — 314 |

| Sector ID | Sorted RSSI, Node-Sector ID, Free Ch. |
|---|---|
| S2 | - -55, N3(S4, free channel list) — 310 |
| S1 | - -60, N1(S0, free channel list) — 306 |
| S5 | - -63, N5(S4, free channel list) — 314 |
| S4 | -65, N4(S1, free channel list) — 312 |
| S0 | - -62, N1(S2, free channel list — 304 |
| ... | |

|    | S2 | S1 | S5 | S4 |
|----|----|----|----|----|
| C0 |    | X  | X  |    |
| C1 |    |    |    | X  |
| C2 | X  | X  | X  |    |
| C3 | X  | X  |    |    |

402 (markers)

|    | S2 | S1 | S5 | S4 |
|----|----|----|----|----|
| C0 |    | *  |    |    |
| C1 |    |    |    | *  |
| C2 | *  |    |    |    |
| C3 |    |    |    |    |

|    | S2 | S1 | S5 | S4 |
|----|----|----|----|----|
| C0 |    |    | *  |    |
| C1 |    |    |    | *  |
| C2 |    | *  |    |    |
| C3 | *  |    |    |    |

|    | S2 | S1 | S5 | S4 |
|----|----|----|----|----|
| C0 |    | *  |    |    |
| C1 |    |    |    | *  |
| C2 |    |    | *  |    |
| C3 | *  |    |    |    |

CHANNEL DIVERSITY AWARENESS IN NEIGHBOR SELECTION

RELATED APPLICATIONS

This application is related to U.S. application Ser. No. 15/595,479, filed May 15, 2017 and U.S. application Ser. No. 15/188,831, filed Jun. 21, 2016.

BACKGROUND

A large and growing population of users is enjoying entertainment through the consumption of digital media items, such as music, movies, images, electronic books, and so on. The users employ various electronic devices to consume such media items. Among these electronic devices (referred to herein as user devices or user equipment) are electronic book readers, cellular telephones, personal digital assistants (PDAs), portable media players, tablet computers, netbooks, laptops, and the like. These electronic devices wirelessly communicate with a communications infrastructure to enable the consumption of the digital media items. In order to wirelessly communicate with other devices, these electronic devices include one or more antennas.

BRIEF DESCRIPTION OF DRAWINGS

The present inventions will be understood more fully from the detailed description given below and from the accompanying drawings of various embodiments of the present invention, which, however, should not be taken to limit the present invention to the specific embodiments, but are for explanation and understanding only.

FIG. 3A is a probed sector table having table entries with RSSI value for a neighbor-sector identifier and an unused channel list according to one embodiment.

FIG. 3B is a consolidated probed sector table with consolidated table entries according to one embodiment.

FIG. 3C is a sorted probed sector table with sorted table entries according to one embodiment.

FIG. 4A is channel-availability table with a marker designating available channels for each of the neighbor-sectors according to one embodiment.

FIG. 4B is an example channel assignment table with a marker designating selected channels for each of the neighbor-sectors according to one embodiment.

FIG. 4C is an example channel assignment table with a marker designating selected channels for each of the neighbor-sectors according to one embodiment.

FIG. 4D is an example channel assignment table with a marker designating selected channels for each of the neighbor-sectors according to one embodiment.

FIG. 5B is an example link-conflict map with a marker designating a radio channel assignment that conflicts with an existing communication link assigned to a same radio channel according to one embodiment.

FIG. 5C is an example link-conflict map with a marker designating a radio channel assignment that conflicts with an existing communication link assigned to a same radio channel according to one embodiment.

DETAILED DESCRIPTION

Figure 1:
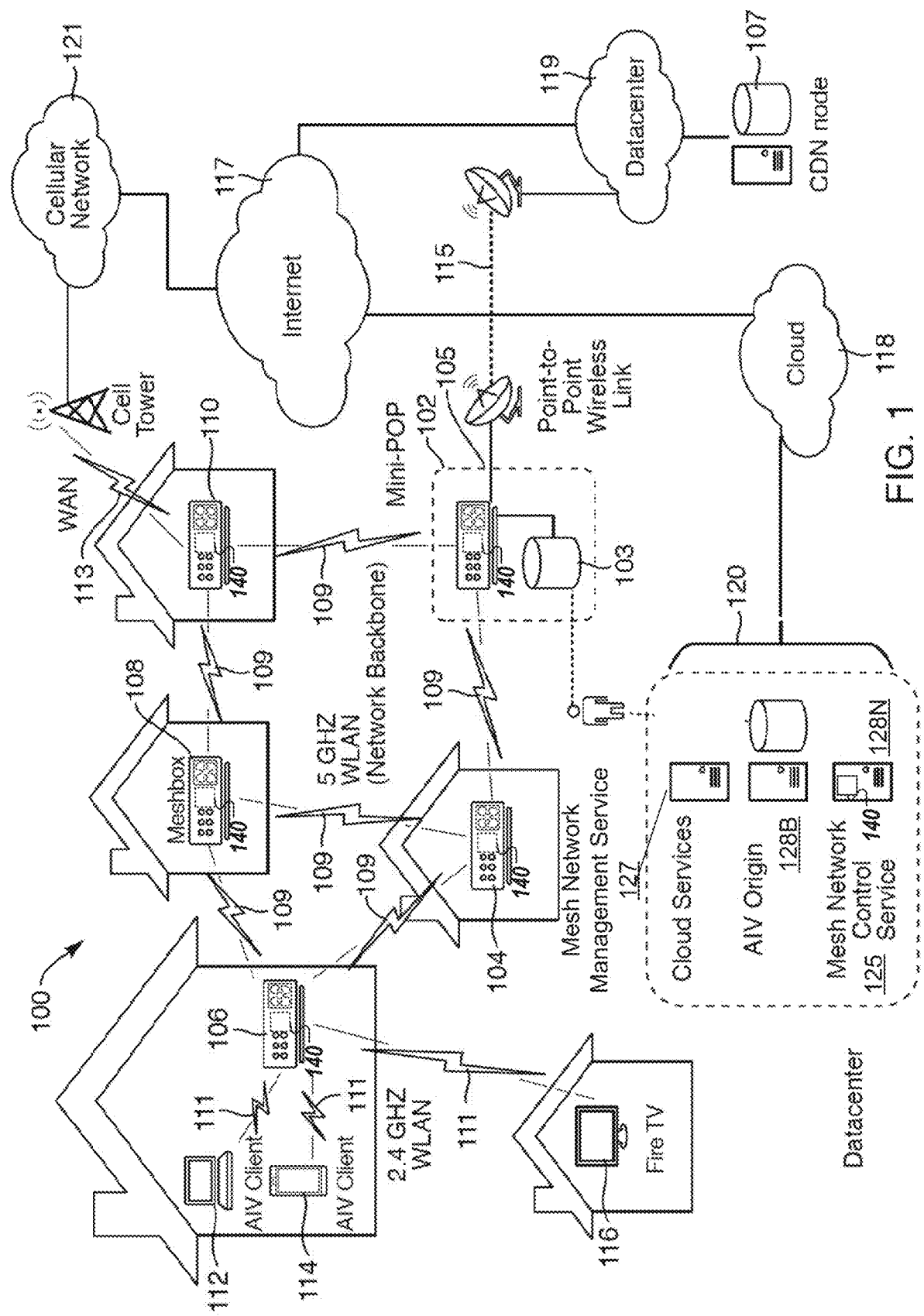
FIG. 1 is a network diagram of network hardware devices organized in a wireless mesh network (WMN) for content distribution to client devices in an environment of limited connectivity to broadband Internet infrastructure according to one embodiment.

Technology for neighbor selection with channel diversity awareness is described. Nodes of a mesh network may establish peer-to-peer wireless links for transmitting messages to each other. In particular, messages may be transferred, through other nodes, between the source and destination nodes that are not in direct communication with each other. In an illustrative example, a mesh network may be employed for digital content distribution to client network devices in an environment of limited connectivity to broadband Internet infrastructure. The digital content may include video and/or audio files. "Digital content item" herein refers to at least a part of a digital content file.

Described herein is a wireless mesh network (WMN) containing multiple mesh network devices, organized in a mesh topology. A WMN is made up of a set of radio links between network devices that forms a communications network to provide wireless connectivity between them. Traffic originating from one device (called a source node) could traverse over several hops before arriving at its intended destination (called a destination node). A "hop" as used herein may refer to a portion of a network path between two neighboring nodes. The radio links between devices could adopt the same wireless technology (e.g. wireless local area network (WLAN) technologies such as Wi-Fi®, personal area network (PAN) technologies, such as Bluetooth® and ZigBee®, or the like). Alternatively, the radio links can operate using over the same wireless spectrum.

The following description is directed to network discovery and network selection of neighboring mesh network devices. For example, when a mesh network device boots up, the mesh network device needs to find its neighbor mesh network devices. The mesh network device scans omnidirectionally over 2.4 GHz for access point (AP) beacon frames that contain an information element (IE, ID, etc.) that identifies a mesh network device, such as having a specific vendor identifier. In one embodiment, beacon frames are continually (e.g., at a defined interval) broadcast from mesh network devices. A separate ID (multiple separate IDs) corresponding to multiple mesh network devices may be identified and stored. The mesh network device determines where each of those neighboring mesh network devices is located and therefore which of its directional antennas may be used to reach each neighbor through a process called neighbor discovery. Once neighboring mesh network devices are found and located through the neighbor discovery process, neighbor mesh network devices are chosen via a neighbor selection process or a channel-aware neighbor selection process.

In some cases, neighbor selection process can be done one by one in a greedy manner. That is, when there is an available radio and an available channel, the neighbor selection process can assign the available radio and randomly selects one of the available channels. This neighbor selection process makes randomly selected channel assignments that do not take into account other optimizations of channel assignments, such as to connect more neighboring mesh network devices with higher RSSI values or reduce local link interference if links conflict with each other on the same selected channel. Described herein are approaches to consider all neighboring mesh network devices at the same time to optimize channel assignments for a more global perspective. The embodiments of the neighbor selection process with channel diversity awareness, as described herein, may connect more neighboring mesh network device with higher RSSI values, reduce local ink interference based on channel assignments, or the like. The initial selection may be done locally, but with a broader network perspective than conventional approaches. In one embodiment, an optimized selection using Mesh Network Control Service (MNCS) can take a full network perspective of the WMN to globally select neighboring mesh network devices for any one of the mesh network devices in the WMN. Once neighboring mesh network devices are selected by the neighbor selection process, the mesh network device can store the radio configuration for routing data traffic to neighboring mesh network devices. In one embodiment, after neighbor mesh network devices are selected, a Mesh Unification Layer (MUL) is informed of the new radio configuration and the MUL can begin mesh peering and authentication. The MUL may be a software interface layer between the IP layer and MAC layer of the OSI software layers. The MUL can abstract the underlying hardware to high level software and can operate a bridge between a data stack of an operating system and the underlying radios. This bridge can be used to route data between the data stack and one of the radios and route data from one radio to another radio.

For description of the neighbor discovery process, an example of a mesh network device having four 5 GHz radios with six directional antennas in 6 sectors; four horizontal sectors and two vertical sectors, is used. For this example, multiple neighboring mesh network devices are allowed per radio and each of four 5 GHz radios with directional antennas can connect to one antenna at a time. Alternatively, in other embodiments, a single neighbor may be allowed per radio. It should be noted that the four radios, as described herein, may be referred to as directional radios or 5 GHZ directional radios, since these antennas are each coupled to a directional antenna in one of the sectors. A sector refers to a radio-antenna combination that sends and receives data over a channel with another radio-antenna combination. Since there are multiple radio-antenna combinations at a device, the sector refers to which of the radio-antenna combination at a particular device is being used. Although some references herein describe one sector at one device connecting to another sector at another device over a channel, it should be noted that it is the combination of a radio and a particular antenna (assigned to that sector) that is transmitting and receiving the data over the channel to and from another combination of a particular antenna and a radio that is transmitting and receiving the data. For the example above, a mesh network device may have six directional antennas, one in each of six sectors. That is each of the six antennas is coupled to one of the radios and each of the six antennas corresponds to a sector.

The mesh network devices in the WMN cooperate in distribution of content files to client consumption devices in an environment of limited connectivity to broadband Internet infrastructure. The embodiments described herein may be implemented where there is the lack, or slow rollout, of suitable broadband Internet infrastructure in developing nations, for example. These mesh networks can be used in the interim before broadband Internet infrastructure becomes widely available in those developing nations. The network hardware devices are also referred to herein as mesh routers, mesh network devices, mesh nodes, Meshboxes, or Meshbox nodes. Multiple network hardware devices wirelessly are connected through a network backbone formed by multiple peer-to-peer (P2P) wireless connections (i.e., wireless connections between multiple pairs of the network hardware devices). The multiple network devices are wirelessly connected to one or more client consumption devices by node-to-client (N2C) wireless connections. The multiple network devices are wirelessly connected to a MNCS device by cellular connections. The content file (or generally a content item or object) may be any type of format of digital content, including, for example, electronic texts (e.g., eBooks, electronic magazines, digital newspapers, etc.), digital audio (e.g., music, audible books, etc.), digital video (e.g., movies, television, short clips, etc.), images (e.g., art, photographs, etc.), or multi-media content. The client consumption devices may include any type of content rendering devices such as electronic book readers, portable digital assistants, mobile phones, laptop computers, portable media players, tablet computers, cameras, video cameras, netbooks, notebooks, desktop computers, gaming consoles, DVD players, media centers, and the like. In some of the embodiments described herein, the mesh network architecture does not include "gateway" nodes that are capable of forwarding broadband mesh traffic to the Internet. The mesh network architecture may include a limited number of point-of-presence (POP) nodes that do have access to the Internet, but the majority of mesh network devices is capable of forwarding broadband mesh traffic between the mesh network devices for delivering content to client consumption devices that would otherwise not have broadband connections to the Internet. Alternatively, instead of POP node having access to broadband Internet infrastructure, the POP node is coupled to storage devices that store the available content for the WMN. The WMN may be self-contained in the sense that content lives in, travels through, and is consumed by nodes in the mesh network. Although various embodiments herein are directed to content delivery, such as for the Amazon Instant Video (AIV) service, the WMNs, and corresponding mesh network devices, can be used as a platform suitable for delivering high bandwidth content in any application where low latency is not critical or access patterns are predictable. The embodiments described herein are compatible with existing content delivery technologies, and may leverage architectural solutions, such as Content Delivery Network (CDN) services like the Amazon AWS CloudFront service. Amazon CloudFront CDN is a global CDN service that integrates with other Amazon Web services products to distribute content to end users with low latency and high data transfer speeds.

FIG. 1 is a network diagram of network hardware devices 102-110, organized in a wireless mesh network (WMN) 100, for content distribution to client devices in an environment of limited connectivity to broadband Internet infrastructure according to one embodiment. The WMN 100 includes multiple network hardware devices 102-110 that connect together to transfer digital content through the WMN 100 to be delivered to one or more client consumption devices connected to the WMN 100. The multiple network hardware devices 102-110 each include a channel-aware neighbor selection manager 140 as described in more detail below with respect to FIGS. 3A-7. The channel-aware neighbor selection manager 140 can be used in a distributed configuration where each of the network hardware devices 102 includes the channel-aware neighbor selection manager 140 to perform the neighbor selection process. Alternatively, the channel-aware neighbor selection manager 140 can be deployed in a centralized configuration in which the channel-aware neighbor selection manager 140 is deployed as a centralized controller, such as in the mesh network control service 125 or the mesh network management service 127.

In the depicted embodiment, the WMN 100 includes a miniature point-of-presence (mini-POP) device 102 (also referred to as mini-POP device), having at least one of a first wired connection to an attached storage device 103 or a point-to-point wireless connection 105 to a CDN device 107 (server of a CDN or a CDN node) of an Internet Service Provider (ISP), or both. The CDN device 107 may be a POP device (also referred to as a POP device), an edge server, a content server device, or another device of the CDN. The mini-POP device 102 may be similar to POP devices of a CDN in operation. However, the mini-POP device 102 is called a miniature to differentiate it from a POP device of a CDN given the nature of the mini-POP device 102 being a single ingress point to the WMN 100; whereas, the POP device of a CDN may be one of many in the CDN.

The point-to-point wireless connection 105 may be established over a point-to-point wireless link 115 between the mini-POP device 102 and the CDN device 107. Alternatively, the point-to-point wireless connection 105 may be established over a directional microwave link between the mini-POP device 102 and the CDN device 107. In other embodiments, the mini-POP device 102 is a single ingress node of the WMN 100 for the content files stored in the WMN 100. Meaning the mini-POP 102 may be the only node in the WMN 100 having access to the attached storage and/or a communication channel to retrieve content files stored outside of the WMN 100. In other embodiments, multiple mini-POP devices may be deployed in the WMN 100, but the number of mini-POP devices should be much smaller than a total number of network hardware devices in the WMN 100. Although a point-to-point wireless connection can be used, in other embodiments, other communication channels may be used. For example, a microwave communication channel may be used to exchange data. Other long distance communication channels may be used, such as a fiber-optic link, satellite link, cellular link, or the like. The network hardware devices of the WMN 100 may not have direct access to the mini-POP device 102, but can use one or more intervening nodes to get content from the mini-POP device. The intervening nodes may also cache content that can be accessed by other nodes. The network hardware devices may also determine a shortest possible route between the requesting node and a node where a particular content file is stored.

The CDN device 107 may be located at a datacenter 119 and may be connected to the Internet 117. The CDN device 107 may be one of many devices in the global CDN and may implement the Amazon CloudFront technology. The CDN device 107 and the datacenter 119 may be co-located with the equipment of the point-to-point wireless link 155. The point-to-point wireless connection 105 can be considered a broadband connection for the WMN 100. In some cases, the mini-POP device 102 does not have an Internet connection via the point-to-point wireless connection 105 and the content is stored only in the attached storage device 103 for a self-contained WMN 100. In such cases, the content in the attached storage can be manually refreshed from time to time.

The WMN 100 also includes multiple mesh nodes 104-110 (also referred to herein as meshbox nodes and network hardware devices). The mesh nodes 104-110 may establish multiple P2P wireless connections 109 between mesh nodes 104-110 to form a network backbone. It should be noted that only some of the possible P2P wireless connections 109 are shown between the mesh nodes 104-110 in FIG. 1. In particular, a first mesh node 104 is wirelessly coupled to the mini-POP device 102 via a first P2P wireless connection 109, as well as being wirelessly coupled to a second mesh node 106 via a second P2P wireless connection 109 and a third mesh node 108 via a third P2P wireless connection. The mesh nodes 104-110 (and the mini-POP device 102) are MRMC mesh network devices. As described herein, the mesh nodes 104-110 do not necessarily have reliable access to the CDN device 107. The mesh nodes 104-110 (and the mini-POP device 102) wirelessly communicate with other nodes via the network backbone via a first set of WLAN channels reserved for inter-node communications. The mesh nodes 102-110 communicate data with one another via the first set of WLAN channels at a first frequency of approximately 5 GHz (e.g., 5 GHz band of the Wi-Fi® network technologies).

Each of the mesh nodes 104-110 (and the mini-POP device 102) also includes multiple node-to-client (N2C) wireless connections 111 to wirelessly communicate with one or more client consumption devices via a second set of WLAN channels reserved for serving content files to client consumption devices connected to the WMN 100. In particular, the second mesh node 106 is wirelessly coupled to a first client consumption device 112 (AIV client) via a first N2C wireless connection 111, a second client consumption device 114 (AIV client) via a second N2C wireless connection 111, and a third client consumption device 116 (e.g., the Fire TV device) via a third N2C wireless connection 111. The second node 106 wirelessly communicates with the client consumption devices via the second set of WLAN channels at a second frequency of approximately 2.4 GHz (e.g., 2.4 GHz band of the Wi-Fi® network technologies).

Each of the mesh nodes 104-110 (and the mini-POP device 102) also includes a cellular connection 113 to wirelessly communicate control data between the respective node and a second device 118 hosting a mesh network control service described below. The cellular connection 113 may be a low bandwidth, high availability connection to the Internet 117 provided by a cellular network. The cellular connection 113 may have a lower bandwidth than the point-to-point wireless connection 105. There may be many uses for this connection including, health monitoring of the mesh nodes, collecting network statistics of the mesh nodes, configuring the mesh nodes, and providing client access to other services. In particular, the mesh node 110 connects to a cellular network 121 via the cellular connection 113. The cellular network 121 is coupled to the second device 118 via the Internet 117. The second device 118 may be one of a collection of devices organized as a cloud computing system that that hosts one or more services 120. The services 120 may include a mesh network control service 125 and a mesh network management service 127. The services 120 may also include cloud services to control setup and manager the mesh nodes, a content delivery service (e.g., AIV origin), as well as other cloud services. The mesh network control service 125 can be one or more cloud services. The cloud services can include a metric collector service, a health and status service, a link selection service, a channel selection service, a content request aggregation service, or the like. There may be APIs for each of these services. Although this cellular connection may provide access to the Internet 117, the amount of traffic that goes through this connection should be minimized, since it may be a relatively costly link. This cellular connection 113 may be used to communicate various control data to configure the mesh network for content delivery. In addition, the cellular connection 113 can provide a global view of the state of the WMN 100 remotely. Also, the cellular connection 113 may aid in the debugging and optimization of the WMN 100. In other embodiments, other low bandwidth services may also be offered through this link (e.g. email, shopping on Amazon.com, or the like).

Although only four mesh nodes 104-110 are illustrated in FIG. 1, the WMN 100 can use many mesh nodes, wireless connected together in a mesh network, to move content through the WMN 100. The 5 GHz WLAN channels are reserved for inter-node communications (i.e., the network backbone). Theoretically, there is no limit to the number of links a given Meshbox node can have to its neighbor nodes. However, practical considerations, including memory, routing complexity, physical radio resources, and link bandwidth requirements, may place a limit on the number of links maintained to neighboring mesh nodes. Meshbox nodes may function as traditional access points (APs) for devices running AIV client software. The 2.4 GHz WLAN channels are reserved for serving client consumption devices. The 2.4 GHz band may be chosen for serving clients because there is a wider device adoption and support for this band. Additionally, the bandwidth requirements for serving client consumption devices will be lower than that of the network backbone. The number of clients that each Meshbox node can support depends on a number of factors including memory, bandwidth requirements of the client, incoming bandwidth that the Meshbox node can support, and the like. For example, the Meshbox nodes provide coverage to users who subscribe to the content delivery service and consume that service through an AIV client on the client consumption devices (e.g., a mobile phone, a set top box, a tablet, or the like). It should be noted that there is a 1-to-many relationship between Meshbox nodes and households (not just between nodes and clients). This means the service can be provided without necessarily requiring a customer to have a Meshbox node located in their house, as illustrated in FIG. 1. As illustrated, the second mesh node 106 services two client consumption devices 112, 114 (e.g., AIV clients) located in a first house, as well as a third client consumption device 116 (e.g., the Fire TV client) located in a second house. The Meshbox nodes can be located in various structures, and there can be multiple Meshbox nodes in a single structure.

The WMN 100 may be used to address two main challenges: moving high bandwidth content to users and storing that content in the network itself. The first challenge may be addressed in hardware through the radio links between mesh nodes and the radio links between mesh nodes and client consumption devices, and in software by the routing protocols used to decide where to push traffic and link and channel management used to configure the WMN 100. The second challenge may be addressed by borrowing from the existing content distribution strategy employed by the content delivery services (e.g., AIV) using caches of content close to the user. The architecture to support content caching is known as a CDN. An example CDN implementation is the AWS CloudFront service. The AWS CloudFront service may include several point-of-presence (POP) racks that are co-located in datacenters that see a lot of customer traffic (for example an ISP), such as illustrated in datacenter 119 in FIG. 1. A POP rack has server devices to handle incoming client requests and storage devices to cache content for these requests. If the content is present in the POP rack, the content is served to the client consumption device from there. If it is not stored in the POP rack, a cache miss is triggered and the content is fetched from the next level of cache, culminating in the "origin," which is a central repository for all available content. In contrast, as illustrated in FIG. 1, the WMN 100 includes the mini-POP device 102 that is designed to handle smaller amounts of traffic than a typical POP rack. Architecturally, the mini-POP device 102 may be designed as a Meshbox node with storage attached (e.g. external hard disk). The mini-POP device 102 may function identically to a POP device with the exception of how cache misses are handled. Because of the lack of broadband Internet infrastructure, the mini-POP device 102 has no traditional Internet connection to the next level of cache. The following describes two different solutions for providing the next level of cache to the mini-POP device 102.

In one embodiment, the mini-POP device 102 is coupled to an existing CDN device 107 via a directional microwave link or other point-to-point wireless link 115. A directional microwave link is a fairly easy way to get a relatively high bandwidth connection between two points. However, line of sight is required which might not be possible with terrain or building constraints. In another embodiment, the mini-POP device 102 can operate with a human in the loop (HITL) to update the cache contents. HITL implies that a person will be tasked with manually swapping out the hard drives with a hard drives with the updated content or adding the content to the hard drive. This solution may be a relatively high bandwidth but extremely high latency solution and may only be suitable if the use cases allow longer times (e.g., hours) to service a cache miss. It should be noted that the mini-POP has a network connection that need not be an Internet connection to handle cache misses. These requests are forwarded to the CDNs. Alternatively, some mini-POP devices may not have network connections and do not handle cache misses as described herein.

The WMN 100 may be considered a multi-radio multi-channel (MRMC) mesh network. MRMC mesh networks are an evolution of traditional single radio WMNs and a leading contender for combating the radio resource contention that has plagued single radio WMNs and prevents them from scaling to any significant size. The WMN 100 has multiple devices, each with multi-radio multi-channel (MRMC) radios. The multiple radios for P2P connections and N2C connections of the mesh network devices allow the WMN 100 to be scaled to a significant size, such as 10,000 mesh nodes. For example, unlike the conventional solutions that could not effectively scale, the embodiments described herein can be very large scale, such as a 100×100 grid of nodes with 12-15 hops between nodes to serve content to client consumption devices. The paths to fetch content files may not be a linear path within the mesh network.

The WMN 100 can provide adequate bandwidth, especially node-to-node bandwidth. For video, content delivery services recommend a minimum of 900 Kbps for standard definition content and 3.5 Mbps for high definition content. It should be noted that the minimum requirement for 720 HD is 1.9 Mbps and a maximum is 3.5 Mbps. For some services to provide HD content, the 3.5 Mbps can be considered the minimum requirement. The WMN 100 can provide higher bandwidths than those recommended for standard definition and high definition content. Prior solutions found that for a 10,000-node mesh network covering one square kilometer, the upper bound on inter-node traffic is 221 kbps. The following can impact bandwidth: forwarding traffic, wireless contention (MAC/PHY), and routing protocols.

In some embodiments, the WMN 100 can be self-contained as described herein. The WMN 100 may be self-contained in the sense that content resides in, travels through, and is consumed by nodes in the mesh network without requiring the content to be fetched outside of the WMN 100. In other embodiments, the WMN 100 can have mechanisms for content injection and distribution. One or more of the services 120 can manage the setup of content injection and distribution. These services (e.g., labeled mesh network control service) can be hosted by as cloud services, such as on one or more content delivery service devices. These mechanisms can be used for injecting content into the network as new content is created or as user viewing preferences change. Although these injection mechanisms may not inject the content in real time, the content can be injected into the WMN 100 via the point-to-point wireless connection 105 or the HITL process at the mini-POP device 102. Availability and impact on cost in terms of storage may be relevant factors in determining which content is to be injected into the WMN 100 and which content is to remain in the WMN 100. A challenge for traditional mesh network architectures is that this content is high bandwidth (in the case of video) and so the gateway nodes that connect the mesh to the larger Internet must be also be high bandwidth. However, taking a closer look at the use case reveals that this content, although high bandwidth, does not need to be low latency. The embodiments of the WMN 100 described herein can provide distribution of content that is high bandwidth, but in a manner that does not need low latency.

In some embodiments, prior to consumption by a node having an AIV client itself or being wirelessly connected to an AIV client executing on a client consumption device, the content may be pulled close to that node. This may involve either predicting when content will be consumed to proactively move it closer (referred to as caching) or always having it close (referred to as replication). Content replication is conceptually straightforward, but may impact storage requirements and requires apriori knowledge on the popularity of given titles.

Another consideration is where and how to store content in the WMN 100. The WMN 100 can provide some fault tolerance so that a single mesh node becoming unavailable for failure or reboot has minimal impact on availability of content to other users. This means that a single mesh node is not the sole provider of a piece of content. The WMN 100 can use reliability and availability mechanisms and techniques to determine where and how to store content in the WMN 100.

The WMN 100 can be deployed in an unpredictable environment. Radio conditions may not be constant and sudden losses of power may occur. The WMN 100 is designed to be robust to temporary failures of individual nodes. The WMN 100 can be designed to identify those failures and adapt to these failures once identified. Additionally, the WMN 100 can include mechanisms to provide secure storage of the content that resides within the WMN 100 and prevent unauthorized access to that content.

The cloud services 120 of the WMN 100 can include mechanisms to deal with mesh nodes that become unavailable, adding, removing, or modifying existing mesh nodes in the WMN 100. The cloud services 120 may also include mechanisms for remote health and management. For example, there may be a remote health interface, a management interface, or both to access the mesh nodes for this purpose. The cloud services 120 can also include mechanisms for securing the WMN 100 and the content that resides in the WMN 100. For example, the cloud services 120 can control device access, DRM, and node authentication.

Figure 2:
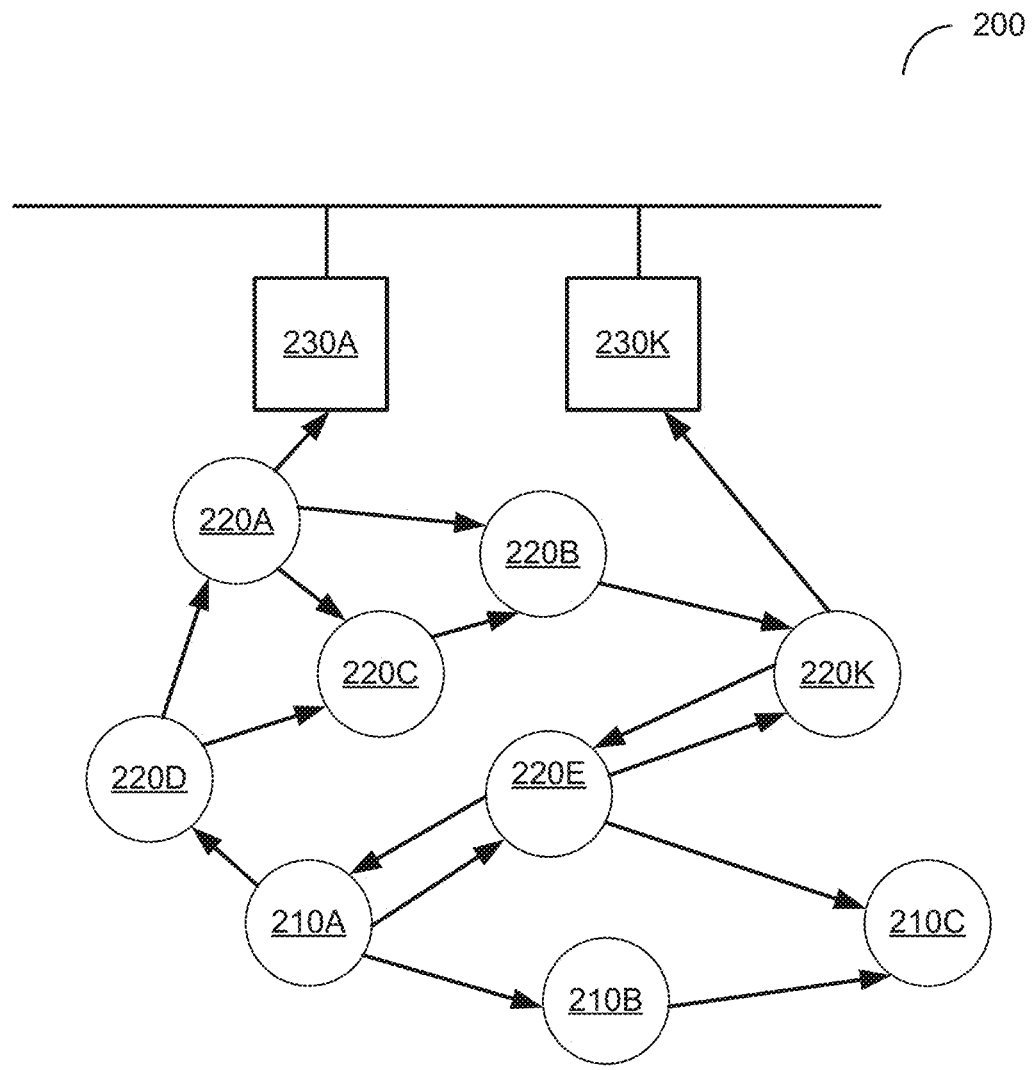
FIG. 2 is a functional network diagram of an illustrative example of a wireless mesh network operating in accordance with embodiments of the present disclosure.

FIG. 2 is a functional network diagram of an illustrative example of a wireless mesh network operating in accordance with embodiments of the present disclosure. In one embodiment, each of the network devices of wireless mesh network 100 of FIG. 1 may implement functions of one or more functional components of FIG. 2. In other embodiments, various other wireless mesh networks may include hardware and/or software components which may implement functions of one or more functional components of FIG. 2.

As schematically illustrated by FIG. 2, an example wireless mesh network 200 may include a plurality of mesh network nodes including communication devices that implement the functions of wireless mesh point stations (MP STA) 210A-210Z, mesh access points (MAP) 220A-220K, and mesh portals (MPP) 230A-220M. In one embodiment, the wireless mesh network 200 may be compliant with IEEE802.11s protocol, which supports broadcast/multicast and unicast delivery using radio-aware path selection metric values over self-configuring multi-hop topologies.

A wireless mesh point station may be provided by a communication device that includes hardware and/or software for implementing Medium Access Control (MAC) and physical layer (PHY) interface to the wireless medium. A wireless access point may be provided by a wireless mesh point station that provides distribution services (i.e., forwarding MAC service data units (MSDUs) including data and network management frames to a wireless destination) via the wireless medium for associated wireless mesh point stations. A mesh portal, also referred to as a network ingress device, is a wireless access point that provides distribution and integration services (i.e., MSDU translation to another network format and MSDU forwarding to a wireless or wired destination), e.g., by one or more wireline or wireless connections to a backbone network.

As noted herein above, network devices may establish peer-to-peer wireless links and transmit messages to each other. In particular, messages may be transferred, through other nodes, between two nodes that are not in direct communication with each other. Thus, a network device may be a source, a destination, or an intermediate node on a mesh path (also referred to herein as a network path).

Upon booting up, a network device may discover and join a wireless mesh network operating in accordance the embodiments of the present disclosure (e.g., wireless mesh network 100 of FIG. 1). Discovering available wireless mesh networks may be performed by passive or active scanning. In the passive scanning mode, the network device records the information from any beacon frames that have been received on one or more radio channels. Beacon frames are periodically transmitted by wireless access points in order to allow network devices to detect and identify the wireless mesh network, as well as match communication parameters for determining whether to join the wireless mesh network. In the active scanning mode, the network device may transmit, on each of one or more radio channels supported by the network device, probe request frames in order to solicit responses from available networks. An access point receiving a probe request may generate a probe response advertising the network parameters.

As described herein, neighbor selection process can be done one by one in a greedy manner, assigning the available radio and randomly selecting one of the available channels without considering channel diversity. By randomly selecting channels for the channel assignments, the neighbor selection process does not take into account other optimizations of channel assignments, such as to connect more neighboring mesh network devices with higher RSSI values or reduce local link interference if links conflict with each other on the same selected channel. Described herein are approaches to consider all neighboring mesh network devices at the same time to optimize channel assignments for a more global perspective. The embodiments of the channel-aware neighbor selection process with channel diversity awareness, as described herein, may connect more neighboring mesh network device with higher RSSI values, reduce local ink interference based on channel assignments, or the like.

In one embodiment, after a neighbor discovery process, a current node (node X) should have multiple potential neighboring mesh network devices (also referred to herein as neighbor) to connect with, e.g., N1, N2, . . . Nr. For each neighbor Nk, we have the following information:

RSSI[i][j], 0<=i, j<=5
i is X's sector index
j is Nk's sector index
RSSI[i] [j] is the RSSI value between two sectors, sector i of X and sector j of Nk.
A neighbor-sector identifier (Neighbor, sector)=BestNeighborSector (sector i of X).
This is the best (sector, neighbor) of X's sector i, which yields the highest RSSI Radio configuration of each neighbor Nk, the radio configuration including:
R0: DISCONNECTED
R1: S1, C0, N=1
R2: S2, C1, N=1
R3: DISCONNECTED, where (Ck means channel k)

This information is the input for the channel-aware neighbor selection process. The output of the channel-aware neighbor selection process includes which sector (radio-antenna combination) of node X connects to which neighbor's sector (radio-antenna combination) and using which channel. It should be noted that the sectors is a radio-antenna combination because the antenna and radio at one mesh network device are used together to communicate data over a communication link with the antenna and radio at another mesh network device. The radios are assigned to a particular channel since all radios operate in the same frequency spectrum. The sector identifies, or otherwise identifies which antenna that is being used to communicate over the communication link to the other mesh network device. The channel-aware neighbor selection process may have the following constraints: only 4 channels available for each radio; the current node X and any neighbor Nk can have at most one link between them; the neighbor Nk's available channel list, and any banned sector of X is ignored.

In one embodiment, the channel-aware neighbor selection process derives a probed sector table at the current node X, such as the probed sector table illustrated in FIG. 3A. FIG. 3A is a probed sector table 300 having table entries 302-314, with RSSI value for a neighbor-sector identifier and an unused channel list according to one embodiment. The probed sector table 300 has table entries 302, 304, 306, 308, 310, 312, and 314. The probed sector table 300 can include multiple entries for the same sector of the current node X and can include multiple entries for the same neighbor nodes but with different sectors. The channel-aware neighbor selection process can consolidate entries of the probed sector table 300 by taking the neighbor-sector identifier with the highest RSSI among all table entries for a given node. In the probed sector table 300, there are two entries for the node N1, including entry 302 and entry 306. Because the RSSI value of entry 306 is higher than entry 302, the entry 302 is removed, as illustrated in the consolidated probed sector table 320 of FIG. 3B. That is, once S1 of the current node X selects the entry 306 to connect to sector S0 of node N1 (neighbor-sector identifier N1/S0), because it has a higher RSSI value (e.g., −60) than the RSSI value (e.g., −62) for the entry 302 for sector 2 of node N1 (N1/S2), the entry 302 is removed from the probed sector table 300, as illustrated in FIG. 3B. Also, because there are two entries 306 and 308 for the sector 1 of the current node, the entry 308 is removed from the probed sector table 300 since the entry 308 has a lower RSSI value than the RSSI value of the entry 306.

FIG. 3B is a consolidated probed sector table 320 with consolidated table entries 304, 306, 310, 312, and 314 according to one embodiment. As described above, the entries of the probed sector table 300 can be consolidated into the consolidated probed sector table 320 by selecting the entries with the highest RSSI values among all table entries and removing entries to the same neighbor node and entries for the same sector of the current node X.

The entries 304, 306, 310, 312, and 314 of the consolidated probed sector table 320 are not sorted. The channel-aware neighbor selection process can sort the consolidated probed sector table 320 according to RSSI values to obtain a sorted probed sector table, such as illustrated in FIG. 3C.

FIG. 3C is a sorted probed sector table 330 with sorted table entries according to one embodiment. The sorted probed sector table 330 includes entries that are sorted in a descending order of RSSI values, starting with a highest RSSI value and ending with a lowest RSSI value. As illustrated, the sorted probed sector table 330 includes entry 310 as a first entry (highest RSSI value), followed by entry 306, entry 314, entry 312, and entry 304 in descending order. It should be noted that the sorted probed sector table 330 can be sorted in an ascending order where the entry having the highest RSSI value is a last entry in the table. Alternatively, the sorted probed sector table 330 can be sorted in a descending order where the entry having the highest RSSI value is a first entry in the table. After sorting based on the RSSI values, the sorted probed sector table 330 has an order of sector 2 (S2), sector 1, sector 5, sector 4, and sector 0 and each sector of the current node has a one-to-one mapping with neighbors (neighbor-sector identifiers) and each neighbor has its own available channel list.

After obtaining the sorted probed sector table 330, the channel-aware neighbor selection process can assign the channels for each neighbor (neighbor-sector identifier). This can be considered a resource allocation problem that can be solved by the channel-aware neighbor selection process to achieve the following goals: connect more neighbors with better RSSI values and reduce local interference, as described below with respect to FIGS. 4A-4E for connecting more neighbors with better RSSI values and FIGS. 5A-5C for reducing local interference.

In one embodiment, a mesh network device has four radios and four channels per radio. Each radio can be coupled to any one of the directional antennas, as described herein. An application processor of the mesh network device stores, in a memory coupled to the application processor, a radio configuration table for each neighboring mesh network devices discovered during a neighbor discovery process. A neighboring mesh network device is a second network device that is reachable by the mesh network device over a single-hop network path. That is the second mesh network device is communicably connected to the mesh network device over a single-hop network path. The application processor generates, using the radio configuration tables, a probed sector table, such as the probed sector table 300 described above. The entries of the probed sector table are indexed by sector identifiers. For example, each entry corresponds to a sector of the mesh network device and a sector corresponds to one of the directional antennas of the mesh network device. For example, the mesh network device can have six sectors, four side sectors and a top sector and bottom sector. An entry contains an RSSI value, a neighbor-sector identifier, and an unused channel list. The neighbor-sector identifier identifies the respective neighboring mesh network device and a sector corresponding to an antenna at the respective neighboring mesh network devices. It should be noted that the channel-aware neighbor selection process can use two separate identifiers, including a device identifier and a sector identifier. The unused channel list identifies the available channels for that particular mesh network device. The application processor sorts the probed sector table to obtain a sorted table according to RSSI values, such as the sorted probed sector table 330 described above. The sorted table includes a sorted order of the entries according to the neighbor-sector identifier having a highest RSSI value. That is the entries are sorted according to a highest RSSI value in an ascending or descending order. The application processor can generate a data structure that includes multiple entries that are sorted according to an order of ascending or descending RSSI values, i.e., the multiple entries can be sorted from a highest RSSI value to a lowest RSSI value. The data structure may be a channel-availability tree structure, as described below with respect to FIG. 4E. The application processor performs a first search of the data structure to obtain a first set of radio channels for a first set of links. Each link is between the mesh network device and a neighboring mesh network device in a first set of mesh network devices. The application processor performs a second search of the data structure to obtain a second set of radio channels for a second set of links, each link being between the mesh network device and a neighboring mesh network device in a second set. The application processor can determine a connectivity-quality metric value for the first set of radio channels and the second set of radio channels. The connectivity-quality metric may be any metric that is indicative of the quality of the connections in the channels, such as physical data rate, a sum or weighted sum of a collection of the individual RSSI values for each link, a number of conflicts in the channels with neighboring nodes such as within two or less network hops, or the like. The application processor selects which set of radio channels to use and sends a neighbor pairing request to each neighboring mesh network device in the respective set. For example, if the application processor determines that the second set of radio channels is higher than a second connectivity-quality metric value of the first set of radio channels, the application processor sends a neighbor pairing request to each neighboring mesh network device in the second set.

As set forth above, the channel assignment by the channel-aware neighbor selection process can be solved as a resource allocation problem. Described below, the channel-aware neighbor selection process can select channels to connect more neighbors with better RSSI values, as described below with respect to FIGS. 4A-4E.

FIG. 4A is a channel-availability table 400 with a marker 402 designating available channels for each of the neighbor-sectors according to one embodiment. The application processor uses the unused channel lists to populate the channel-available table 400 with markers corresponding to the available channels for each neighbor-sector identifier. As illustrated, the four neighbor-sector identifiers with the four highest RSSI values from the sorted probed sector table 330 are used. That is the channel availability of sector S0 is not included in the channel-availability channel table 400. In another embodiment, the channel-availability table 400 can include all neighbor-sectors discovered in the neighbor discovery process. The markers 402 can represent the channels that are available for channels with the particular mesh network device. As noted herein, each of the four channels can be assigned to one link. So, if one channel is assigned to a first link, the same channel cannot be assigned to a second link. As such, the following tables in FIGS. 4B-4D illustrate different example channel assignment tables with a final set of selected channels.

FIG. 4B is an example channel assignment table 410 with a marker designating selected channels for each of the neighbor-sectors according to one embodiment. Because sector S2 and sector S1 are assigned available channels C0 and C2, the sector S5 is disconnected because there are no available channels to assign to it. The channel assignment table 410 represents a set of radio channels, including channel C0 to sector S1, channel C1 to sector S4, channel C2 to sector S2 and channel C3 is not assigned to any sector.

As described above, there are more solutions for the possible channel assignments.

FIG. 4C is an example channel assignment table 420 with a marker designating selected channels for each of the neighbor-sectors according to one embodiment. The channel assignment table 420 represents a set of radio channels, including channel C0 to sector S5, channel C1 to sector S4, channel C2 to sector S1, and channel C3 to sector S2.

FIG. 4D is an example channel assignment table 430 with a marker designating selected channels for each of the neighbor-sectors according to one embodiment. The channel assignment table 430 represents a set of radio channels, including channel C0 to sector S1, channel C1 to sector S4, channel C2 to sector S5, and channel C3 to sector S2.

The set of radio channels from the channel assignment table 420 and channel assignment table 430 may be better than the second channels from the channel assignment table 410 because four sectors can be connected instead of three sectors. The application processor can determine each of the possible solutions for the channels and select the best possible solution. As described in more detail below, whether there are multiple solutions with all four sectors being assigned, additional processing can be done to select between the multiple solutions, such as computing connectivity-quality metric values for each of the set of radio channel solutions and selecting the set with the highest values. It should be noted that there may be some cases where there may be less than four neighbor-sectors available for channel assignment and some cases where four neighbor-sectors are available but there is no viable channel assignment which can connect all four neighbors. The resource allocation problem can also be solved by using other data structures and searches for possible solutions, such as the channel-availability tree structure and depth-first-search (DFS) traversals of the tree data structure described below with respect to FIG. 4E.

Figure 4E:
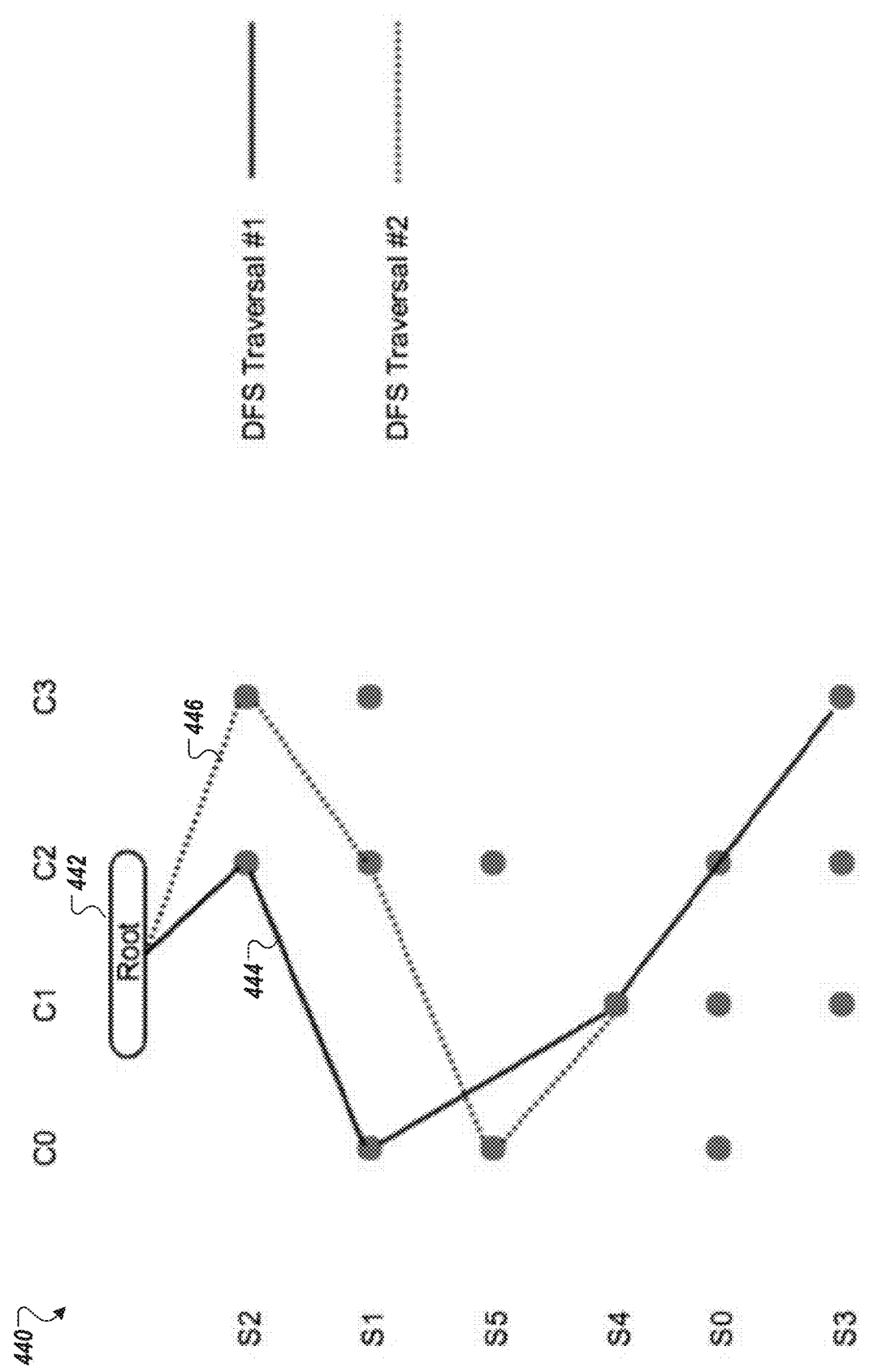
FIG. 4E is a channel-availability tree structure having neighbor-sector identifiers as hierarchy levels in the sorted order below a root and an available channel marker for each of four radio channels that is available for each of the neighbor-sector identifiers according to the unused channel lists according to one embodiment.

FIG. 4E is a channel-availability tree structure 440 having neighbor-sector identifiers as hierarchy levels in the sorted order below a root 442 and an available channel marker for each of four radio channels that is available for each of the neighbor-sector identifiers according to the unused channel lists according to one embodiment. The application processor can perform a first DFS traversal 444 (also referred to as tree traversal or tree search) of the channel-availability tree structure 440 to obtain a first set of radio channels for a first set of links used by the mesh network device to communicate with other neighboring mesh network devices. Each link is between the mesh network device and a neighboring mesh network device in a first set The DFS traversal is a form of graph traversal to find a solutions set. The DFS traversal can select only one channel at each level of the tree structure. Since the tree structure is sorted according to the sort order, the sector having the highest RSSI is selected first, the sector having the second highest RSSI value is selected second, and so on. This ensures that the sectors having higher RSSI values are selected before sectors having lower RSSI values. More or less DFS traversals may be done on the channel-availability tree structure 440 to search all options. The DFS traversal starts searching from the sector with the highest RSSI value, guaranteeing the neighbor with the highest RSSI value will be connected.

As illustrated in FIG. 4E, the first DFS traversal 444 selects the sector S2, sector S1, sector S4, and sector S3. The second DFS traversal 446 selects the sectors S2, sectors S1, sectors S5, and sector S4. In terms of connectivity, both solutions sets have four possible links to establish, but the second DFS traversal 446 has better link quality in general. The second DFS traversal 446 can have a better link quality as reflected by a connectivity-quality metric value. The connectivity-quality metric value can be a value assigned to each of the DFS traversals.

In one embodiment, the application processor computes a first connectivity-quality metric value for the first set of radio channels and a second connectivity-quality metric value for the second set of radio channels. The application processor compares the first connectivity-quality metric value and the second connectivity-quality metric value to select a set with a highest connectivity-quality metric value. The application processor sends a neighbor pairing request to each of the neighboring mesh network devices in the set with the highest connectivity-quality metric value. The neighbor pairing requests may specify the corresponding channel assignment determined by the channel-aware neighbor selection process.

In one embodiment, the connectivity-quality metric value is equal to a weighted sum, as set forth in equation (1):

$$\text{connectivity quality} = \text{SUM}\{w(Si)\}, \quad (1)$$

where i=sector index of the selected sectors for each DFS traversal. The summing function can be used to prefer more links and w(Si) is the weight given to each sector. This weight can satisfy the following three requirements as set forth in equations (2), (3), and (4):

$$w(Si) > w(Sj), \text{ if } RSSI(Si) > RSSI(Sj) \quad (2)$$

$$|w(Si) - w(SDI)| > |w(Sm) - w(Sn)|, \text{ if } |RSSI(Si) - RSSI(Sj)| > |RSSI(Sm) - RSSI(Sn)| \quad (2)$$

$$0 < w(\ ) < 1w \quad (3)$$

Equation (2) provides a larger weight to sectors with higher RSSI values. Larger RSSI differences in Equation (3) lead to larger weight differences.

In one embodiment, a simple function of w( ) can satisfy the above requirements, such as the Equation (4):

$$w(Si) = \frac{RSSI(Si) - \text{minRSSI}}{\text{maxRSSI} - \text{minRSSI}} \quad (4)$$

In another embodiment, the function of w( ) can be expressed in terms of a physical data rate if the mapping between RSSI values and physical data rates are known, such as expressed in the following Equation (5):

$$w(Si) = \text{PhyRate}(Si) \text{given } RSSI(Si) \quad (5)$$

As noted above, because there are multiple solutions, the application processor performs a second DFS traversal 446 of the channel-availability tree structure 440 to obtain a second set of radio channels for a second set of links used by the mesh network device to communicate with other neighboring mesh network devices. Each link is between the mesh network device and a neighboring mesh network device in a second set.

In another embodiment, the application processor, to compute the first connectivity-quality metric value, weights each of the RSSI values in the first set of radio channels by a weighting value to obtain first weighted values. The application processor sums the first weighted values to obtain a first weighted sum. To compute the second connectivity-quality metric value, the application processor weights each of the RSSI values in the second set of radio channels by a weighting value to obtain second weighted values. The application processor sums the second weighted values to obtain a second weighted sum.

As set forth above, the channel assignment by the channel-aware neighbor selection process can be solved as a resource allocation problem. Described above, the channel-aware selection process can select channels to connect more neighboring mesh network devices with higher RSSI values. Described below, the channel-aware neighbor selection process can select channels to connect neighboring mesh network devices that reduce local interference, as described below with respect to FIGS. 5A-5C.

It should be noted that the application processor can perform more than two DFS traversals of the channel-availability tree structure 440 to obtain more than two solution sets of radio channels. For example, if sector S1 were sorted as having the highest RSSI value, the application processor could perform three DFS traversals through each of the three nodes corresponding to sectors S1. By sorting the channel-availability tree structure 440 from highest RSSI value to lowest RSSI value, the application processor can obtain solution sets of radio channels where the sectors with the higher RSSI values are more likely to be selected over sectors with lower RSSI values. It should also be noted that DFS traversals of the channel-availability tree structure 440 is one way to solve for different possible solutions sets of radio channels; other approaches may be used to solve for the different solutions.

Figure 5A:
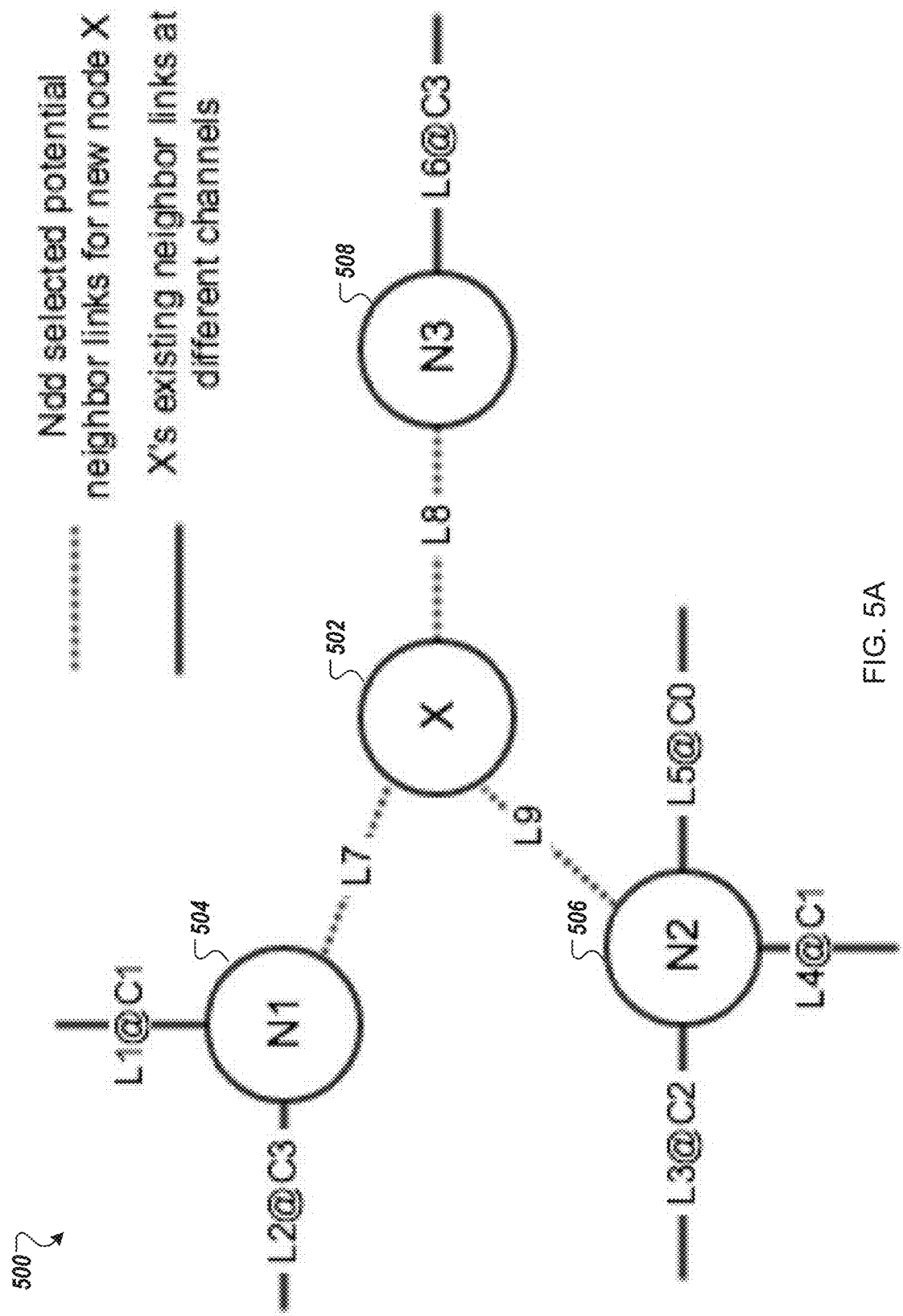
FIG. 5A is a functional network diagram of an illustrative example of a channel-aware neighbor selection process at a current node to pair with three neighboring mesh network devices according to one embodiment.

FIG. 5A is a functional network diagram 500 of an illustrative example of a channel-aware neighbor selection process at a current node 502 to pair with three neighboring mesh network devices 504, 506, 508 according to one embodiment. During a neighbor discovery process, the current node 502 locates the three neighboring mesh network devices and receives radio configuration information from each. The radio configuration information can specify that the first neighboring mesh network device 504 is already connected to other mesh network device with two separate links: link L1 on channel C1 and link L2 on channel C3. The radio configuration information also specifies that the second neighboring mesh network device 506 is already connected to other mesh network device with three wo separate links: link L3 on channel C2, link L4 on channel C1, and link L5 on channel C0. The radio configuration information also specifies that the third neighboring mesh network device 508 is already connected to another mesh network device with a separate link: link L6 on channel C3.

The current node 502 performs the channel-aware neighbor selection process using the radio configuration information and considering radio channel conflicts when making channels. The channel-aware neighbor selection process can select three potential neighbor links: link L7 with the first neighboring mesh network device 504, link L9 with the second neighboring mesh network device 506, and link L8 with the third neighboring mesh network device 508. The channel-aware neighbor selection process can make channels after considering radio channel conflicts by generating multiple link-conflict maps, such as those illustrated in FIGS. 5B and 5C. Interference between wireless links in mesh networks may be difficult to estimate and may depend on various factors, including for example, orientation of two links, traffic volume on each link, distance between two links, and traffic direction of each link. In one approach, a radio channel conflict can exist for any two links that have the same channel where the two links are equal to or less than two network hops away from one another. This can assume a worst case scenario where the individual factors described above can be assumed with any two links, which are less or equal to two network hops away, will interfere with each other. Alternatively, other predetermined number of network hops can be used to determine radio channel conflicts. Based on this assumption, the following link-conflict maps can be generated for two different possible sets of channels.

Figures 5B, 5C:
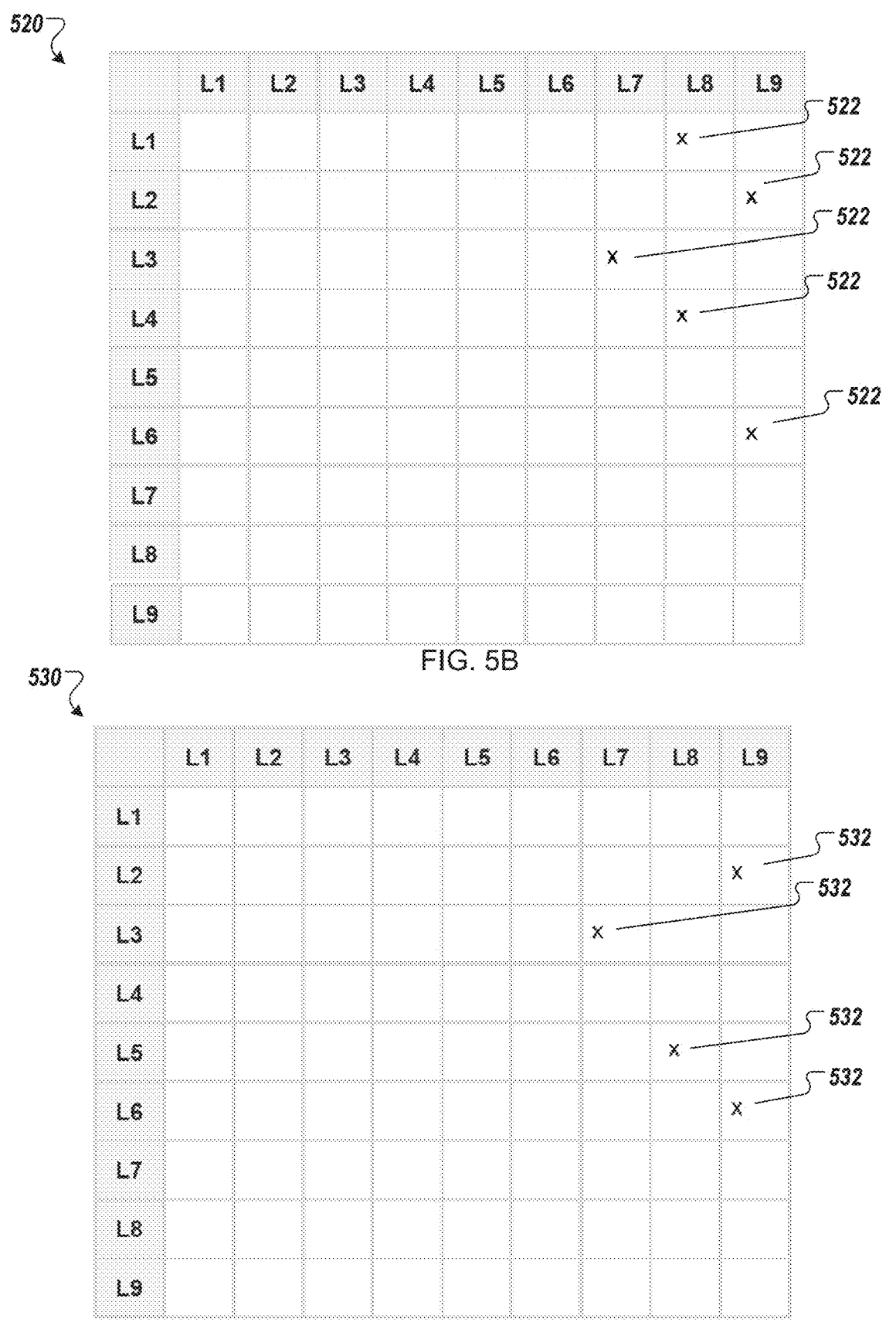

FIG. 5B is an example link-conflict map 520 with a marker 522 designating a radio channel assignment that conflicts with an existing communication link assigned to a same radio channel according to one embodiment. The link-conflict map 520 assumes a first set of radio channels, including link L7 assigned to channel C2, link L8 assigned to channel C1, and link L9 assigned to channel C3. By assigning link L7 to channel C2, link L7 interferes with link L3 that is also assigned to channel C2, as shown in FIG. 5A. By assigning link L8 to channel C1, link L8 interferes with link L1 and link L4, as shown in FIG. 5A By assigning link L9 to channel C3, link L8 interferes with link L2 and link L6, as shown in FIG. 5A The first set of radio channels results in five total conflicts as illustrated by the markers 522. Each of the markers 522 represents a radio channel assignment of the first set of radio channels that conflicts with an existing communication link assigned to a same radio channel, where the existing communication link being less than or equal to two network hops from the mesh network device.

FIG. 5C is an example link-conflict map 530 with a marker 532 designating a second radio channel assignment that conflicts with an existing communication link assigned to a same radio channel according to one embodiment. The link-conflict map 530 assumes a second set of radio channels, including link L7 assigned to channel C2, link L8 assigned to channel C0, and link L9 assigned to channel C3. By assigning link L7 to channel C2, link L7 interferes with link L3 that is also assigned to channel C2, as shown in FIG. FIG. 5B. By assigning link L8 to channel C0, link L8 interferes with link L5, as shown in FIG. FIG. 5B. By assigning link L9 to channel C3, link L8 interferes with link L2 and link L6, as shown in FIG. FIG. 5B. The second set of radio channels results in four total conflicts, as illustrated by the markers 532. Each of the markers 532 represents a radio channel assignment of the second set of radio channels that conflicts with an existing communication link assigned to a same radio channel, where the existing communication link being less than or equal to two network hops from the mesh network device.

In other embodiments, additional link-conflict maps may be generated for other sets of channels.

Referring back to FIG. 5A, once the link-conflict maps have been generated by the channel-aware neighbor selection process, the channel-aware neighbor selection process can select the best channel assignment which yields the least conflicts in the link-conflict maps. Between the two link-conflict maps 520 and 530, the channel-aware neighbor selection process selects the second set of radio channels corresponding to the link-conflict map 530 because the link-conflict map 530 has less total conflicts that the link-conflict map 520. In one embodiment, the channel-aware neighbor selection process selects, using the first link-conflict map 520 and the second link-conflict map 530, a set of radio channels having a least number of conflicts from the first set of radio channels and the second set of radio channels. The channel-aware neighbor selection process sends the neighbor pairing request to each of the three neighboring mesh network devices 504, 506, and 508.

Figure 6:
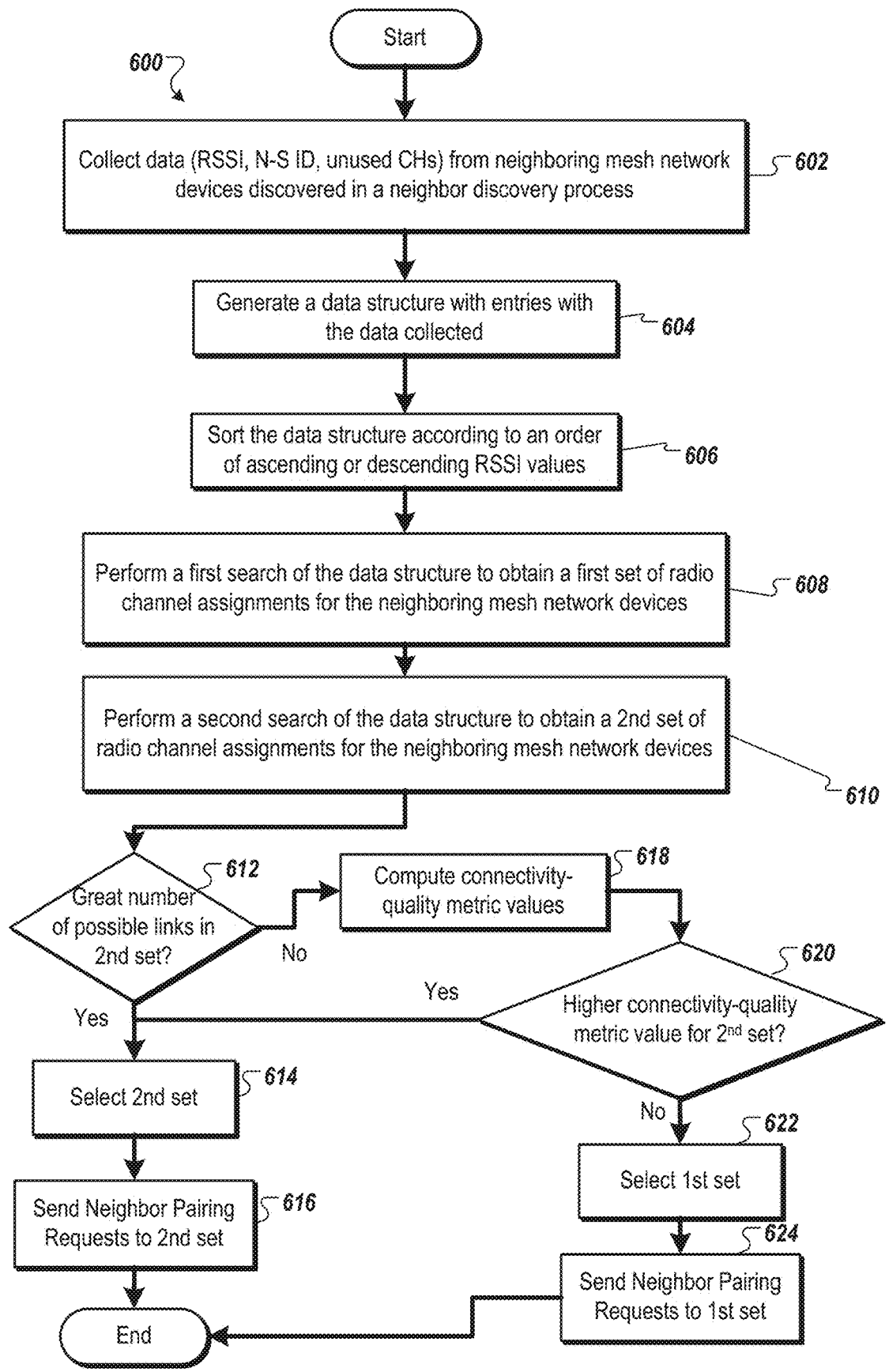
FIG. 6 is a flow diagram of one embodiment of a method of a channel-aware neighbor selection process by a channel-aware neighbor selection manager deployed at a mesh network device, in accordance with embodiments of the present disclosure.

FIG. 6 is a flow diagram of one embodiment of a method 600 of a channel-aware neighbor selection process by a channel-aware neighbor selection manager deployed at a mesh network device, in accordance with embodiments of the present disclosure. The method 600 may be performed by processing logic that includes hardware (e.g., circuitry, dedicated logic, programmable logic, microcode, etc.), software (e.g., instructions run on a processor to perform hardware simulation), or a combination thereof. In one embodiment, the method 600 may be performed by the mesh network devices of FIG. 1, 2, or 5. The method 600 may be performed on individual nodes that are distributed throughout the network in a distributed configuration. The method 600 may be performed on a computing system in a centralized configuration, such as at mesh node control service or the like.

Referring to FIG. 6, at block 602, the processing logic implementing the method 600 may begin by receiving data from neighbor mesh network devices discovered in a neighbor discovery process. In one embodiment, the processing logic receives first data from a first neighboring mesh network device, second data from a second neighboring mesh network device, and third data from a third neighboring mesh network device. The first data includes a first RSSI value, a first neighbor-sector identifier, and a first unused channel list. The first neighbor-sector identifier identifies an antenna at the first neighboring mesh network device. The second data includes a second RSSI value, a second neighbor-sector identifier, and a second unused channel list. The second neighbor-sector identifier identifies an antenna at the second neighboring mesh network device. The third data includes a third RSSI value, a third neighbor-sector identifier, and a third unused channel list. The third neighbor-sector identifier identifies an antenna at the third neighboring mesh network device.

At block 604, the processing logic generates a data structure include at least a first entry with the first data, a second entry with the second data, and a third entry with the third data. At block 606, the processing logic sorts the data structure according to an order of ascending or descending RSSI values. At block 608, the processing logic performs a first search of the data structure to obtain a first set of radio channels for a first set of links, each link being between the mesh network device and a neighboring mesh network device in a first set. At block 610, the processing logic performs a second search of the data structure to obtain a second set of radio channels for a second set of links, each link being between the mesh network device and a neighboring mesh network device in a second set.

At block 612, the processing logic determines if the second set of radio channels has more possible links to mesh network devices than the first set of radio channels. If the second set of radio channels has more possible links, the second set of radio channels is selected at block 614 and sends a neighbor pairing request to each neighboring mesh network device in the second set at block 616. If the first set has a higher number of possible links, the processing logic can proceed to block 622 and 624. However, if the first set and the second set of radio channels have the same number of possible links, the processing logic can compute a first connectivity-quality metric value for the first set and a second connectivity-quality metric value for the second set at block 618.

At block 620, the processing logic determines whether the second set of radio channels is higher than a second connectivity-quality metric value of the first set of radio channels. If the second set of radio channels is higher than a second connectivity-quality metric value of the first set at block 620, the processing logic selects the second set of radio channels at block 614 and sends a neighbor pairing request to each neighboring mesh network device in the second set at block 616. However, if the first set of radio channels has a higher connectivity-quality metric, the processing logic selects the first set of radio channels at block 622 and sends a neighbor pairing request to each neighboring mesh network device in the first set at block 624. Although FIG. 6 shows that the method 600 ends after the neighbor pairing requests are sent, the processing logic may perform additional operations to establish the communication links with the neighboring mesh network devices.

In a further embodiment, the processing logic generates a first link-conflict map for the first set of radio channels and a second link-conflict map. The first link-conflict map includes a marker for each radio channel assignment of the first set of radio channels that conflicts with an existing communication link assigned to a same radio channel, the existing communication link traversing less than or equal to two hops from the mesh network device. Similarly, the second link-conflict map includes a marker for each radio channel assignment of the second set of radio channels that conflicts with an existing communication link assigned to a same radio channel, the existing communication link traversing less than or equal to two hops from the mesh network device. The processing logic selects, using the first link-conflict map and the second link-conflict map, a set of radio channels having a least number of conflicts from the first set of radio channels and the second set of radio channels. This decision can be done in connection with the decision on connectivity-quality metric values. Alternatively, this decision can be done instead of the decision on connectivity-quality metrics. For example, once the set of radio channels is selected, the processing logic sends the neighbor pairing request to each of the neighboring mesh network devices in the set with at least one of the highest connectivity-quality metric value or the least number of conflicts.

In a further embodiment, the processing logic receives fourth data from a fourth neighboring mesh network device. The fourth data includes a fourth RSSI value, a fourth neighbor-sector identifier, and a fourth unused channel list. The fourth neighbor-sector identifier identifies an antenna at the fourth neighboring mesh network device. Now, the data structure includes at least the first entry, the second entry, the third entry, and the fourth entry sorted according to the order of ascending or descending RSSI values.

In a further embodiment, the data structure is a channel-availability tree structure and the processing logic performs the first search by performing a DFS traversal of the tree structure to obtain the first set of radio channels. Similarly, the processing logic performs the second search by performing a second DFS traversal of the tree structure to obtain the second set of radio channels.

In a further embodiment, when determining that the second set of radio channels has the higher connectivity-quality metric value than the first set of radio channels, the processing logic computes a first connectivity-quality metric value for the first set of radio channels and a second connectivity-quality metric value for the second set of radio channels. The processing logic compares the first connectivity-quality metric value and the second connectivity-quality metric value to determine that the second set is higher than a second connectivity-quality metric value of the first set. Alternatively, the processing logic can determine that the first connectivity-quality metric value is greater than the second connectivity-quality metric.

In another embodiment, the processing logic computes the first connectivity-quality metric value by assigning a weighting value to each of the RSSI values in the first set of radio channels to obtain first weighted values and summing the first weighted values to obtain a first weighted sum. For example, a first weighting value for the highest RSSI value may be greater than a second weighting value for at least one of the other RSSI values. Similarly, the processing logic computes the second connectivity-quality metric value by assigning a weighting value to each of the RSSI values in the second set of radio channels to obtain second weighted values and summing the second weighted values to obtain a second weighted sum. The processing logic can compare the first weighted sum and the second weighted sum to determine which set has a higher connectivity-quality metric.

In a further embodiment, the processing logic can determine a weighting value by subtracting a minimum RSSI value from the respective one of the RSSI values in the first set to obtain a first result and subtracting the minimum RSSI value from a maximum RSSI value to obtain a second result. The processing logic divides the first result by the second result to obtain the weighting value. The minimum RSSI value and the maximum RSSI value can be defined by the network specification, the device specification, or may be defined by an operator of the network. For example, the minimum RSSI value may be a first hard coded value and the maximum RSSI value can be a second hard coded value. The minimum RSSI value may be the lowest RSSI value acceptable for establishing a communication link between radios of two mesh network devices and the maximum RSSI value may be the highest RSSI value for establishing a communication link. The maximum RSSI value may be the highest possible RSSI value obtainable as a result of a maximum transmit power of the radios.

As described herein, neighboring mesh network device can be discovered during a neighbor discovery process. In one embodiment, during a neighbor discovery process of a mesh network device having a first radio, a second radio, a third radio, a fourth radio, and a fifth radio, the processing logic performs various operations. For example, the processing logic i) receives, via the fifth radio of the mesh network device, a 2.4 GHz beacon frame from a second mesh network device, the 2.4 GHz beacon frame including a first informational element identifying the second mesh network device as an available access point (having access point capability) in the WMN; ii) listens, for a defined time period, on a first radio channel of the first radio of the mesh network device, a first radio channel of the second radio of the mesh network device, a first radio channel of the third radio of the mesh network device, and a first radio channel of the fourth radio of the mesh network device; iii) repeats step ii) on a second radio channel, a third radio channel, and a fourth radio channel for each of the first radio, the second radio, the third radio, and the fourth radio; iv) in response to steps ii) and iii), receives, via the first radio, a 5 GHz mesh frame from the second mesh network device, the 5 GHz mesh frame including an identifier (ID) of the second mesh network device; v) compares the first informational element to the ID to determine a mesh network device identifier that identifies the second mesh network device and a sector identifier that identifies a source antenna from which the 5 GHz mesh frame was transmitted, a first RSSI value corresponding to the 5 GHz mesh frame, an unused radio, and an unused radio channel of the second mesh network device, wherein the unused radio and the unused radio channel are not currently utilized by the second mesh network device; and vi) sends a discovery request frame to the unused radio of the second mesh network device on the unused radio channel via each of the first radio, the second radio, the third radio, and the fourth radio. During ii) and vi), the first radio is selectively coupled to a first one of a plurality of directional antennas of the mesh network device, the second radio is selectively coupled to a second one of the plurality of directional antennas, the third radio is selectively coupled to a third one of the plurality of directional antennas, and the fourth radio is selectively coupled to a fourth one of the plurality of directional antennas.

In a further embodiment, the processing logic vii) receives a locate probe from the second mesh network device on the unused channel, in response to the discovery request frame, via at least one of the first radio, the second radio, the third radio, or the fourth radio, the locate probe including a source sector identifier that identifies a second antenna from which the locate probe is transmitted; and viii) determines a second signal strength indicator value corresponding to the locate probe.

In another embodiment, to establish a communication link between the mesh network device and a neighboring mesh network device, the processing logic i) sends a neighbor pairing request to a first mesh network device in the second set via a first radio of the mesh network device. The neighbor pairing request may include: (1) a source sector identifier that identifies a source antenna at the mesh network device to exchange data with the second mesh network device; (2) a destination sector identifier at the second mesh network device to exchange the data with the mesh network device; (3) a radio channel identifier that identifies which of the first radio channel, the second radio channel, the third radio channel, or the fourth radio channel to exchange the data between the mesh network device and the second mesh network device, and (4) a media access control (MAC) address of a second radio of the mesh network device, and a radio configuration table for the mesh network device. The processing logic ii) receives a neighbor pairing response from the first mesh network device via the first radio, the neighbor pairing response to confirm establishment of a communication link between the second radio of the mesh network device and first radio of the first mesh network device; and iii) repeats steps i) and ii) for a second mesh network device in the second set for the second radio, a third mesh network device in the second set for a third radio of the mesh network device, and a fourth network device in the second set for a fourth radio of the mesh network device.

Figure 7:
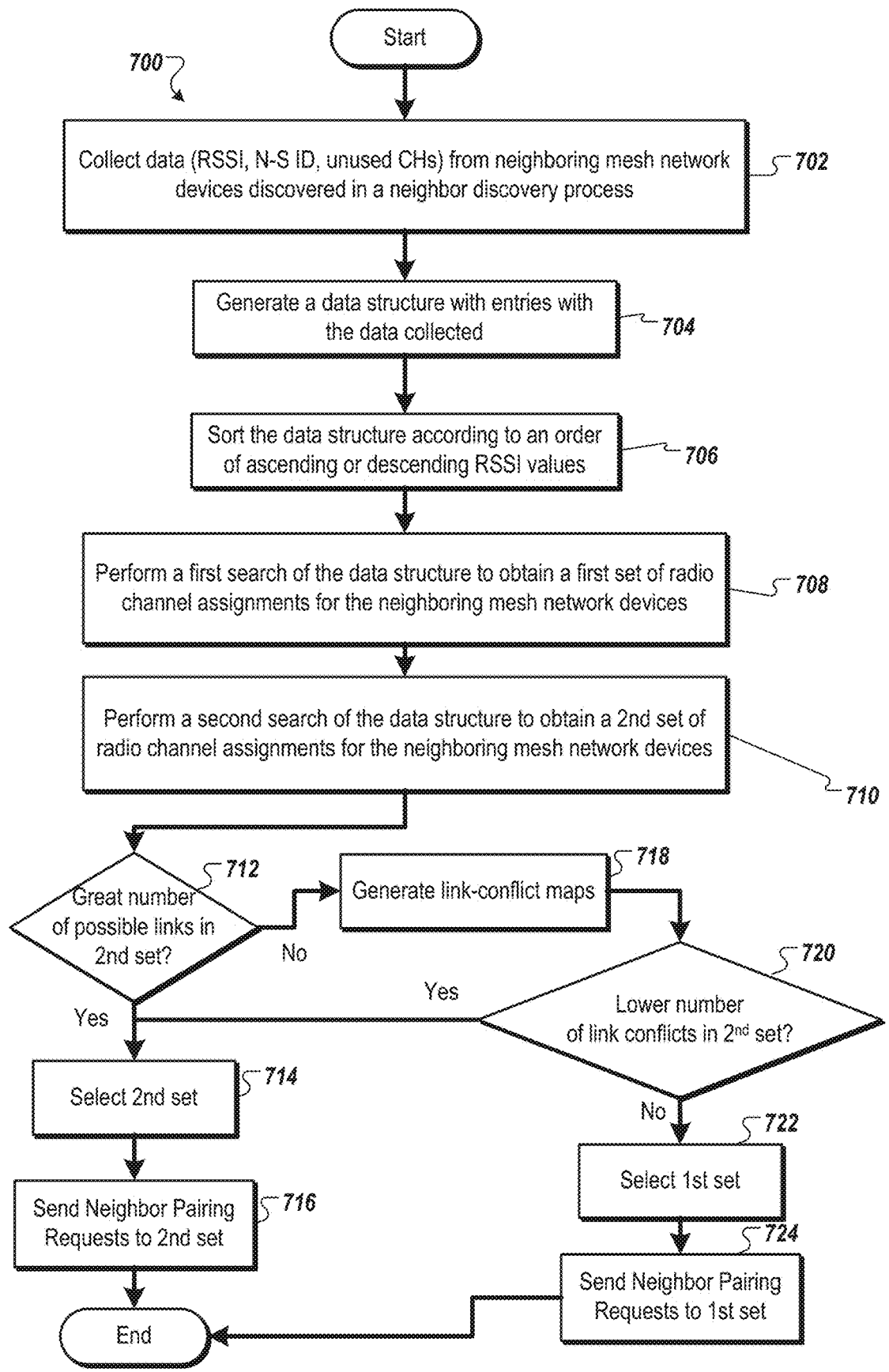
FIG. 7 is a flow diagram of one embodiment of a method of a channel-aware neighbor selection process by a channel-aware neighbor selection manager deployed at a mesh network device, in accordance with embodiments of the present disclosure.

FIG. 7 is a flow diagram of one embodiment of a method 700 of a channel-aware neighbor selection process by a channel-aware neighbor selection manager deployed at a mesh network device, in accordance with embodiments of the present disclosure. The method 700 may be performed by processing logic that includes hardware (e.g., circuitry, dedicated logic, programmable logic, microcode, etc.), software (e.g., instructions run on a processor to perform hardware simulation), or a combination thereof. In one embodiment, the method 700 may be performed by the mesh network devices of FIG. 1, 2, or 5. The method 700 may be performed on individual nodes that are distributed throughout the network in a distributed configuration. The method 700 may be performed on a computing system in a centralized configuration, such as at mesh node control service or the like.

Referring to FIG. 7, at block 702, the processing logic implementing the method 700 may begin by receiving data from neighbor mesh network devices discovered in a neighbor discovery process. In one embodiment, the processing logic receives first data from a first neighboring mesh network device, second data from a second neighboring mesh network device, and third data from a third neighboring mesh network device. The first data includes a first RSSI value, a first neighbor-sector identifier, and a first unused channel list. The first neighbor-sector identifier identifies an antenna at the first neighboring mesh network device. The second data includes a second RSSI value, a second neighbor-sector identifier, and a second unused channel list. The second neighbor-sector identifier identifies an antenna at the second neighboring mesh network device. The third data includes a third RSSI value, a third neighbor-sector identifier, and a third unused channel list. The third neighbor-sector identifier identifies an antenna at the third neighboring mesh network device.

At block 704, the processing logic generates a data structure include at least a first entry with the first data, a second entry with the second data, and a third entry with the third data. At block 706, the processing logic sorts the data structure according to an order of ascending or descending RSSI values. At block 708, the processing logic performs a first search of the data structure to obtain a first set of radio channels for a first set of links, each link being between the mesh network device and a neighboring mesh network device in a first set. At block 710, the processing logic performs a second search of the data structure to obtain a second set of radio channels for a second set of links, each link being between the mesh network device and a neighboring mesh network device in a second set.

At block 712, the processing logic determines if the second set of radio channels has more possible links to mesh network devices than the first set of radio channels. If the second set of radio channels has more possible links, the second set of radio channels is selected at block 714 and sends a neighbor pairing request to each neighboring mesh network device in the second set at block 716. If the first set has a higher number of possible links, the processing logic can proceed to block 722 and 724. However, if the first set and the second set of radio channels have the same number of possible links, the processing logic can generate a first link-conflict map for the first set of radio channels and a second link-conflict map for the second set of radio channels at block 718. The first link-conflict map includes a marker for each radio channel assignment of the first set of radio channels that conflicts with an existing communication link assigned to a same radio channel, the existing communication link traversing less than or equal to two hops from the mesh network device. Similarly, the second link-conflict map includes a marker for each radio channel assignment of the second set of radio channels that conflicts with an existing communication link assigned to a same radio channel, the existing communication link traversing less than or equal to two hops from the mesh network device.

At block 720, the processing logic determines whether the second set of radio channels has a lower number of conflicts than the first set of radio channels. If the second set of radio channels has a lower number of conflicts than the first set at block 720, the processing logic selects the second set of radio channels at block 714 and sends a neighbor pairing request to each neighboring mesh network device in the second set at block 716. However, if the first set of radio channels has a lower number of conflicts, the processing logic selects the first set of radio channels at block 722 and sends a neighbor pairing request to each neighboring mesh network device in the first set at block 724. Although FIG. 7 shows that the method 700 ends after the neighbor pairing requests are sent, the processing logic may perform additional operations to establish the communication links with the neighboring mesh network devices.

It should be noted that although methods 600 and 700 are illustrated and described separately, in other embodiments, the operations of methods 600 and 700 may be combined for a method that uses both connectivity-quality metric values (e.g., blocks 618 and 620) and link-conflict maps (e.g., blocks 718 and 720). That is, in one embodiment, the method computes the both connectivity-quality metric values and generates the link-conflict maps. These can be treated as two weighted factors in the solution set for radio channels. For example, the set of radio channels can be determined using the following equation (6):

$$\text{Solution Set} = w1(X(\ )) + w2(Y(\ )) \quad (6)$$

where X represents the connectivity-quality metric function and Y represents the link-conflict map function. As noted herein, the channel-aware neighbor selection process tries to connect more neighbors with better RSSI values, reduce local interference, or both. However, as shown in equation 6, these goals can be weighted using weights $w1$ and $w2$, where weight $w1$ is the weight assigned to the connectivity-quality metric function and weight $w2$ is the weight assigned to the link-conflict map function. When it is only important to reduce local interference, the weight $w1$ can be 0 or can significantly less than the weight $w2$. Similarly, when trying to maximize the number of neighbors with better RSSI values, the weight $w2$ can be 0 or significantly lower than the weight $w1$. It should be noted that the outcomes of these two functions can be combined in other manners than expressed in equation (6).

In a further embodiment, the processing logic computes a first connectivity-quality metric value for the first set of radio channels and a second connectivity-quality metric value for the second set of radio channels. The processing logic compares the first connectivity-quality metric value and the second connectivity-quality metric value. When determining which of the first link-conflict map or the second link-conflict map has a least number of conflicts, the processing logic can either select one of the first set or the second set of radio channels with a highest connectivity-quality metric value or select one of the first set or the second set of radio channels with the least number of conflicts.

In a further embodiment, the processing logic receives fourth data from a fourth neighboring mesh network device. The fourth data includes a fourth RSSI value, a fourth neighbor-sector identifier, and a fourth unused channel list. The fourth neighbor-sector identifier identifies an antenna at the fourth neighboring mesh network device. Now, the data structure includes at least the first entry, the second entry, the third entry, and the fourth entry sorted according to the order of ascending or descending RSSI values.

In a further embodiment, the data structure is a channel-availability tree structure and the processing logic performs the first search by performing a DFS traversal of the tree structure to obtain the first set of radio channels. Similarly, the processing logic performs the second search by performing a second DFS traversal of the tree structure to obtain the second set of radio channels.

In a further embodiment, when determining that the second set of radio channels has the higher connectivity-quality metric value than the first set of radio channels, the processing logic computes a first connectivity-quality metric value for the first set of radio channels and a second connectivity-quality metric value for the second set of radio channels. The processing logic compares the first connectivity-quality metric value and the second connectivity-quality metric value to determine that the second set is higher than a second connectivity-quality metric value of the first set. Alternatively, the processing logic can determine that the first connectivity-quality metric value is greater than the second connectivity-quality metric.

In another embodiment, the processing logic computes the first connectivity-quality metric value by assigning a weighting value to each of the RSSI values in the first set of radio channels to obtain first weighted values and summing the first weighted values to obtain a first weighted sum. Similarly, the processing logic computes the second connectivity-quality metric value by assigning a weighting value to each of the RSSI values in the second set of radio channels to obtain second weighted values and summing the second weighted values to obtain a second weighted sum.

The processing logic can compare the first weighted sum and the second weighted sum to determine which set has a higher connectivity-quality metric.

In a further embodiment, the processing logic can determine a weighting value by subtracting a minimum RSSI value from the respective one of the RSSI values in the first set to obtain a first result and subtracting the minimum RSSI value from a maximum RSSI value to obtain a second result. The processing logic divides the first result by the second result to obtain the weighting value.

As described herein, neighboring mesh network device can be discovered during a neighbor discovery process as described above with respect to method 600 of FIG. 6.

Figure 8:
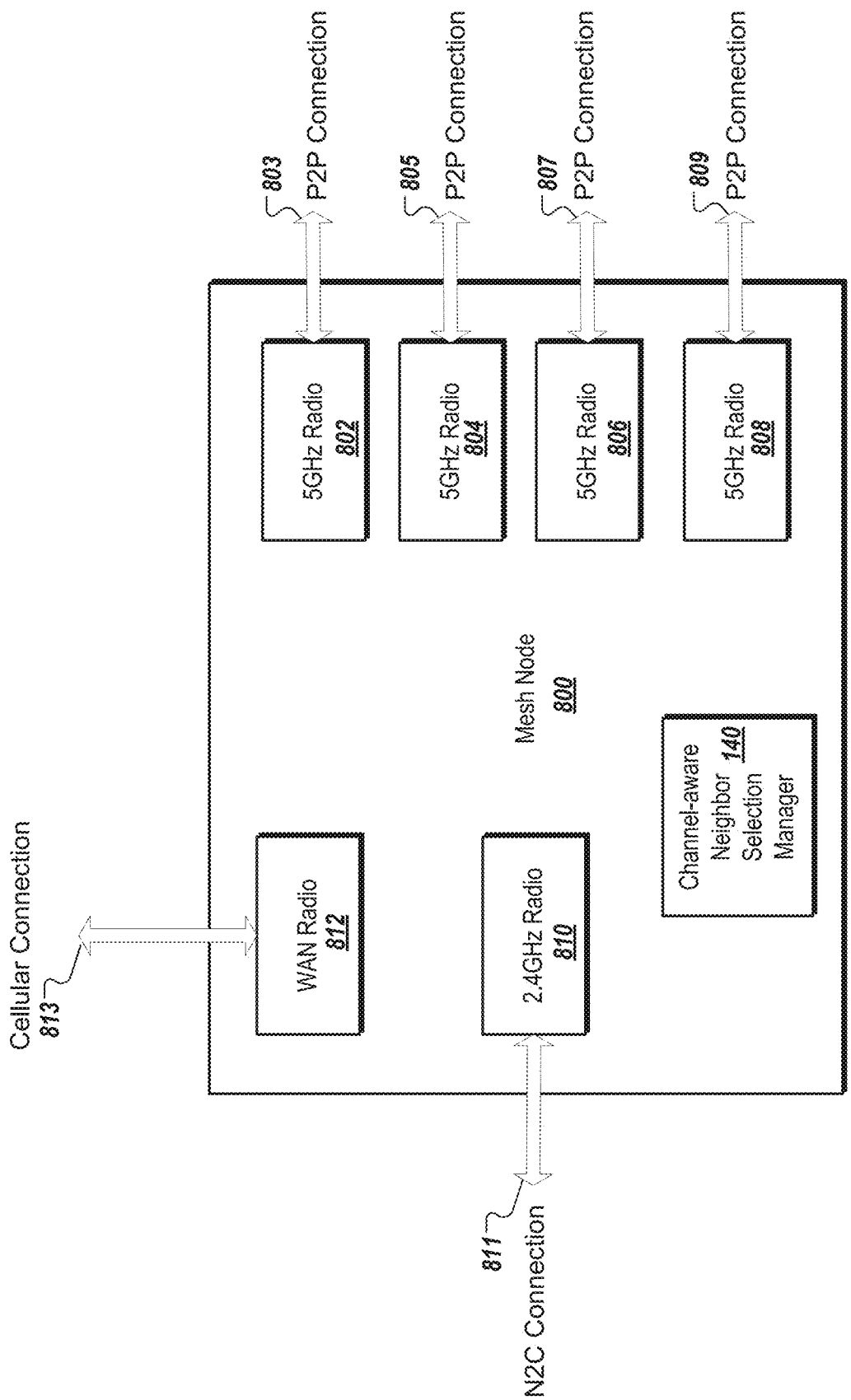
FIG. 8 is a block diagram of a mesh node with multiple radios and a channel-aware neighbor selection manager according to one embodiment.

FIG. 8 is a block diagram of a mesh node 800 with multiple radios and a channel-aware neighbor selection manager 140 according to one embodiment. The operations of the channel-aware neighbor selection manager 140 are described above with respect to FIGS. 3B-7. The mesh node 800 includes a first 5 GHz radio 802, a second 5 GHz radio 804, a third 5 GHz radio 806, a fourth 5 GHz radio 808, a 2.4 GHz radio 810, and a cellular (WAN) radio 812. The first 5 GHz radio 802 creates a first P2P wireless connection 803 between the mesh node 800 and another mesh node (not illustrated) in a WMN. The second 5 GHz radio 804 creates a second P2P wireless connection 805 between the mesh node 800 and another mesh node (not illustrated) in the WMN. The third 5 GHz radio 806 creates a third P2P wireless connection 807 between the mesh node 800 and another mesh node (not illustrated) in the WMN. The fourth 5 GHz radio 808 creates a fourth P2P wireless connection 809 between the mesh node 800 and another mesh node (not illustrated) in the WMN. The 2.4 GHz radio 810 creates a N2C wireless connection 811 between the mesh node 800 and a client consumption device (not illustrated) in the WMN. The N2C wireless connection may be one of a second set of one or more WLAN connections that operate at a second frequency of approximately 2.4 GHz. The cellular radio 812 creates a cellular connection between the mesh node 800 and a device in a cellular network (not illustrated). In other embodiments, more than one 2.4 GHz radios may be used for more N2C wireless connections. Alternatively, different number of 5 GHz radios may be used for more or less P2P wireless connections with other mesh nodes. In other embodiments, multiple cellular radios may be used to create multiple cellular connections.

In some embodiments, the mesh node 800 may be any one of the mesh network device described herein. In one embodiment, the mesh node 800 may be an ingress node or a mini-POP node that has attached storage and a network connection to access content outside of the wireless mesh network. Multiple network hardware devices are wirelessly connected through a network backbone formed by multiple P2P wireless connections. These P2P wireless connections are wireless connections between different pairs of the network hardware devices. The P2P wireless connections may be a first set of WLAN connections that operate at a first frequency of approximately 5.0 GHz. The multiple network hardware devices may be wirelessly connected to one or more client consumption devices by one or more N2C wireless connections. Also, the multiple network hardware devices may be wirelessly connected to a mesh network control services (MNCS) device by cellular connections. Each network hardware device includes a cellular connection to a MNCS service hosted by a cloud computing system. The cellular connections may have lower bandwidths than the point-to-point wireless link.

During operation, the mesh node 800 may receive a first request for a first content file from the first client consumption device over the first N2C connection 811. The mesh node 800 sends a second request for the first content file to a second network hardware device through the network backbone via a first set of zero or more intervening network hardware devices between the first network hardware device and the second network hardware device. The mesh node 800 receives the first content file through the network backbone via the first set of zero or more intervening network hardware devices and sends the first content file to the first client consumption device over the first N2C connection 811. In a further embodiment, the mesh node 800 includes the WAN radio 812 to wirelessly connect to a MNCS device by a cellular connection 813 to exchange control data.

In some embodiments, a path between the mesh node 800 and an ingress node (or any other mesh network device) could include zero or more hops of intervening network hardware devices. In some cases, the path may include up to 12-15 hops within a mesh network of 100×100 network hardware devices deployed in the WMN. In some embodiments, a number of network hardware devices in the WMN is greater than fifty. The WMN may include hundreds, thousands, and even tens of thousands of network hardware devices.

In some embodiments, the mesh node 800 includes memory to store content files, control and command data, as well as the aggregate data described herein for channel-aware neighbor selection. The memory of the first network hardware device may be volatile memory, non-volatile memory, or a combination of both. When a content file is not stored in the memory or the storage of the mesh node 800, the mesh node 800 generates and sends a request to another node in the wireless mesh network. Intervening network hardware devices can make similar determinations to locate the content file in the WMN. In the event that the first content file is not stored in the WMN, the content file can be requested from the mini-POP node. When the mini-POP node does not store the content file, the mini-POP can take action to obtain the first content file, such as requesting the first content file from a CDN over a point-to-point link. Alternatively, the human in the loop process can be initiated as described herein.

In a further embodiment, the P2P wireless connections 803, 805, 807, 809 are WLAN connections that operate in a first frequency range and the N2C connections 811 are WLAN connections that operate in a second frequency range. In another embodiment, the P2P wireless connections 803, 805, 807, 809 operate at a first frequency of approximately 5.0 GHz and the N2C connections 811 operate at a second frequency of approximately 2.4 GHz.

Figure 9:
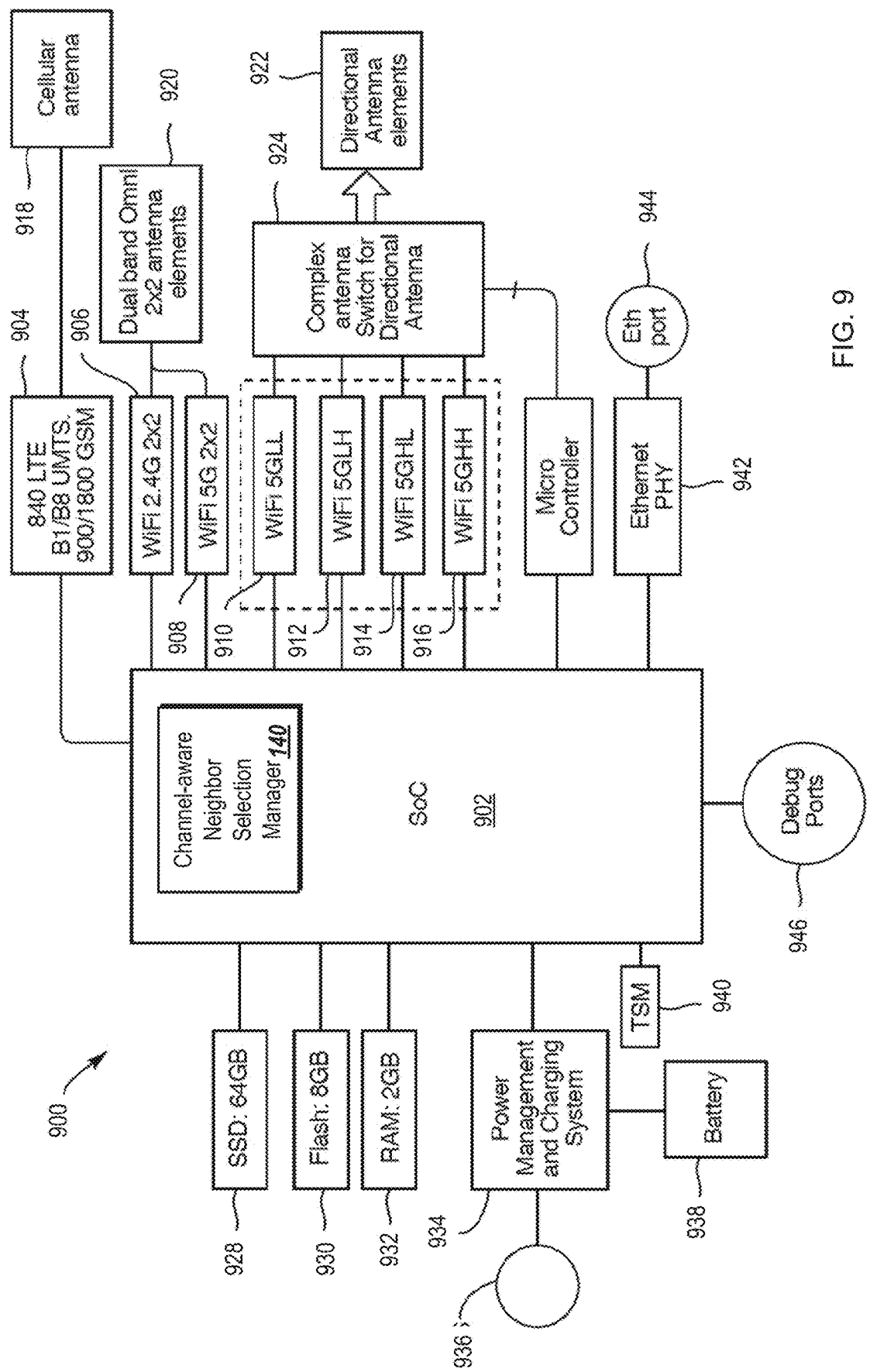
FIG. 9 is a block diagram of a mesh network device with a channel-diversity-aware neighbor selection manager channel-aware neighbor selection manager according to one embodiment.

FIG. 9 is a block diagram of a mesh network device 900 with a channel-aware neighbor selection manager 140 according to one embodiment. The mesh network device 900 may be one of many mesh network devices organized in a WMN (e.g., WMN 100). The mesh network device 900 is one of the nodes in a mesh topology in which the mesh network device 900 cooperates with other mesh network devices in distribution of content files to client consumption devices in an environment of limited connectivity to broadband Internet infrastructure, as described herein. The mesh network device 900 may be the mini-POP node 102 of FIG. 1. Alternatively, the mesh network device 900 may be any one of the mesh network devices 109-110 of FIG. 1. In another embodiment, the mesh network device 900 is any one of the network hardware devices 202-210 of FIG. 2. In another embodiment, the mesh network device 900 is any of the nodes 502-508 in FIG. 5.

The mesh network device 900 includes a system on chip (SoC) 902 to process data signals in connection with communicating with other mesh network devices and client consumption devices in the WMN. The SoC 902 includes a processing element (e.g., a processor core, a central processing unit, or multiple cores) that processes the data signals and controls the radios to communicate with other devices in the WMN. In one embodiment, the SoC 902 is a dual core SoC, such as the ARM A15 1.5 GHz with hardware network acceleration. The SoC 902 may include memory and storage, such as 2 GB DDR RAM and 64 GB eMMC coupled to the SoC 902 via external HDD interfaces (e.g., SATA, USB3, or the like). The SoC 902 can implement the channel-aware neighbor selection manager 140 as processing logic comprising software, firmware, hardware, or any combination thereof. The SoC 902 may include multiple RF interfaces, such as a first interface to the first RF module 904 (e.g., HSCI interface for cellular module (3G)), a second interface to the WLAN 2.4 GHz radio 906, a third interface to the WLAN 2.4 GHz radio 908, and multiple interfaces to the WLAN 5 GHz radios, such as on a PCIe bus. In one embodiment, the SoC 902 is the IPQ8064 Qualcomm SoC or the IPQ4029 Qualcomm SoC. Alternatively, other types of SoCs may be used, such as the Annapurna SoC, or the like. Alternatively, the mesh network device 900 may include an application processor that is not necessarily considered to be a SoC.

The mesh network device 900 may also include memory and storage. For example, the mesh network device 900 may include SSD 64 GB 928, 8 GB Flash 930, and 2 GB 932. The memory and storage may be coupled to the SoC 902 via one or more interfaces, such as USB 3.0, SATA, or SD interfaces. The mesh network device 900 may also include a single Ethernet port 944 that is an ingress port for Internet Protocol (IP) connection. The Ethernet port 944 is connected to the Ethernet PHY 942, which is connected to the SoC 902. The Ethernet port 944 can be used to service the mesh network device 900. Although the Ethernet port 944 could provide wired connections to client devices, the primary purpose of the Ethernet port 944 is not to connect to client devices, since the 2.4 GHz connections are used to connect to clients in the WMN. The mesh network device 900 may also include one or more debug ports 946, which are coupled to the SoC 902. The memory and storage may be used to cache content, as well as store software, firmware or other data for the mesh network device 900.

The mesh network device 900 may also include a power management and charging system 934. The power management and charging system 934 can be connected to a power supply 936 (e.g., 240V outlet, 120V outlet, or the like). The power management and charging system 934 can also connect to a battery 938. The battery 938 can provide power in the event of power loss. The power management and charging system 934 can be configured to send a SoS message on power outage and backup system state. For example, the WLAN radios can be powered down, but the cellular radio can be powered by the battery 938 to send the SoS message. The battery 938 can provide limited operations by the mesh network device 900, such as for 10 minutes before the entire system is completely powered down. In some cases, power outage will likely affect a geographic area in which the mesh network device 900 is deployed (e.g., power outage that is a neighborhood wide phenomenon). The best option may be to power down the mesh network device 900 and let the cloud service (e.g., back end service) know of the outage in the WMN. The power management and charging system 934 may provide a 15V power supply up to 21 watts to the SoC 902. Alternatively, the mesh network device 900 may include more or less components to operate the multiple antennas as described herein.

The mesh network device 900 includes a first radio frequency (RF) module 904 coupled between the SoC 902 and a cellular antenna 918. The first RF module 904 supports cellular connectivity using the cellular antenna 918. In one embodiment, the cellular antenna 918 includes a primary wide area network (WAN) antenna element and a secondary WAN antenna element. The first RF module 904 may include a modem to cause the primary WAN antenna, the secondary WAN antenna, or both to radiate electromagnetic energy in the 900 MHz band and 1800 MHz band for the 2G specification, radiate electromagnetic energy in the B1 band and the B8 band for the 3G specification, and radiate electromagnetic energy for the B40 band. The modem may support Cat3 band, 40 TD-LTE, UMTS: Band 1, Band 8, and GSM: 900/1800. The modem may or may not support CDMA. The cellular modem may be used for diagnostics, network management, down time media caching, meta data download, or the like. Alternatively, the first RF module 904 may support other bands, as well as other cellular technologies. The mesh network device 900 may include a GPS antenna and corresponding GPS module to track the location of the mesh network device 900, such as moves between homes. However, the mesh network device 900 is intended to be located inside a structure, the GPS antenna and module may not be used in some embodiments.

The mesh network device 900 includes a first set of wireless local area network (WLAN) modules 906, 908 coupled between the SoC 902 and dual-band omnidirectional antennas 920. A first WLAN module 906 may support WLAN connectivity in a first frequency range using one of the dual-band omnidirectional antennas 920. A second WLAN module 908 may support WLAN connectivity in a second frequency range using one of the dual-band omnidirectional antennas 920. The dual-band omnidirectional antennas 920 may be two omnidirectional antennas for 2.4 GHz. The directional antennas 922 may be eight sector directional antennas for 5 GHz with two antennas at orthogonal polarizations (horizontal/vertical) in each sector. These can be setup with 45 degree 3 dB beam width with 11 dB antenna gain. The dual-band omnidirectional antennas 920 and the directional antennas 922 can be implemented within a fully switchable antenna architecture controlled by micro controller 926. For example, each 5 GHz radio can choose any 2 sectors (for 2 2×2 MU-MIMO streams).

The mesh network device 900 includes a second set of WLAN modules 910-916 coupled between the SoC 902 and antenna switching circuitry 924. The second set of WLAN modules 910-916 support WLAN connectivity in the second frequency range using a set of directional antennas 922. The second set of WLAN modules 910-916 is operable to communicate with the other mesh network devices of the WMN. The antenna switching circuitry 924 is coupled to a micro controller 926. The micro controller 926 controls the antenna switching circuitry 924 to select different combinations of antennas for wireless communications between the mesh network device 900 and the other mesh network devices, the client consumption devices, or both. For example, the micro controller 926 can select different combinations of the set of directional antennas 922.

In another embodiment, a filter switch bank is coupled between the antenna switching circuitry 924 and the second set of WLAN modules 910-916. In another embodiment, the filter switch bank can be implemented within the antenna switching circuitry 924.

In the depicted embodiment, the first set of WLAN modules include a first a first 2×2 2.4 GHz MIMO radio 906 and a 2×2 5 GHz MIMO radio 908. The second set of WLAN modules includes a first 2×2 5 GHz MIMO radio 910 ("5GLL"), a second 2×2 5 GHz MIMO radio 912 ("5GLH"), a third 2×2 5 GHz MIMO radio 914 ("5GHL"), and a fourth 2×2 5 GHz MIMO radio 916 ("5GHH"). The dual-band omnidirectional antennas 920 may include a first omnidirectional antenna and a second omnidirectional antenna (not individually illustrated in FIG. 9). The set of directional antennas 922 comprises: a first horizontal orientation antenna; a first vertical orientation antenna; a second horizontal orientation antenna; a second vertical orientation antenna; a third horizontal orientation antenna; a third vertical orientation antenna; a fourth horizontal orientation antenna; a fourth vertical orientation antenna; a fifth horizontal orientation antenna; a fifth vertical orientation antenna; a sixth horizontal orientation antenna; a sixth vertical orientation antenna; a seventh horizontal orientation antenna; a seventh vertical orientation antenna; an eighth horizontal orientation antenna; an eighth vertical orientation antenna; a ninth antenna (upper antenna described herein); a tenth antenna (upper antenna); an eleventh antenna (bottom antenna); and a twelfth antenna (bottom antenna).

In one embodiment, the mesh network device 900 can handle antenna switching in a static manner. The SoC 902 can perform sounding operations with the WLAN radios to determine a switch configuration. Switching is not done on a per packet basis or at a packet level. The static switch configuration can be evaluated a few times a day by the SoC 902. The SoC 902 can include the intelligence for switching decision based on neighbor sounding operations done by the SoC 902. The micro controller 926 can be used to program the antenna switching circuitry 924 (e.g., switch matrix) since the mesh network device 900 may be based on CSMA-CA, not TDMA. Deciding where the data will be coming into the mesh network device 900 is not known prior to receipt, so dynamic switching may not add much benefit. It should also be noted that network backbone issues, such as one of the mesh network devices becoming unavailable, may trigger another neighbor sounding process to determine a new switch configuration. Once the neighbor sounding process is completed, the mesh network device 900 can adapt a beam patter to be essentially fixed since the mesh network devices are not intended to move once situated.

In one embodiment, the antenna switching circuitry 924 includes multiple diplexers and switches to connect different combinations of antennas to the multiple radios. One configuration for the antenna switching circuitry 924 is a switch matrix architecture. In this architecture, there are six 2×2 WLAN radios (also referred to as the Wi-Fi® radios). Five radios are 5 GHz band and one radio is a 2.4 GHz radio. A switch matrix is implemented to allow the connection of each and any of the four 2×2 radios to any of the Vx/Hx MIMO antennas. Based on the switch matrix configuration and based on the routing algorithms input, each 2×2 radio can connect to a specific antenna pair in a specific direction. Each 2×2 radio can operate using a dedicated and unique WLAN frequency channel concurrently or simultaneously. In this architecture, two of the radios (5 GHz radio and 2.4 GHz radio) may have fixed connections to the omnidirectional antennas (Ant0 and Ant1). These two radios may also have access to all the WLAN 2.4 GHz and 5 GHz band channels. In another embodiment, this architecture also may also have 4G/3G and 2G WAN radio to provide cellular connectivity to the network device 900.

Figure 10:
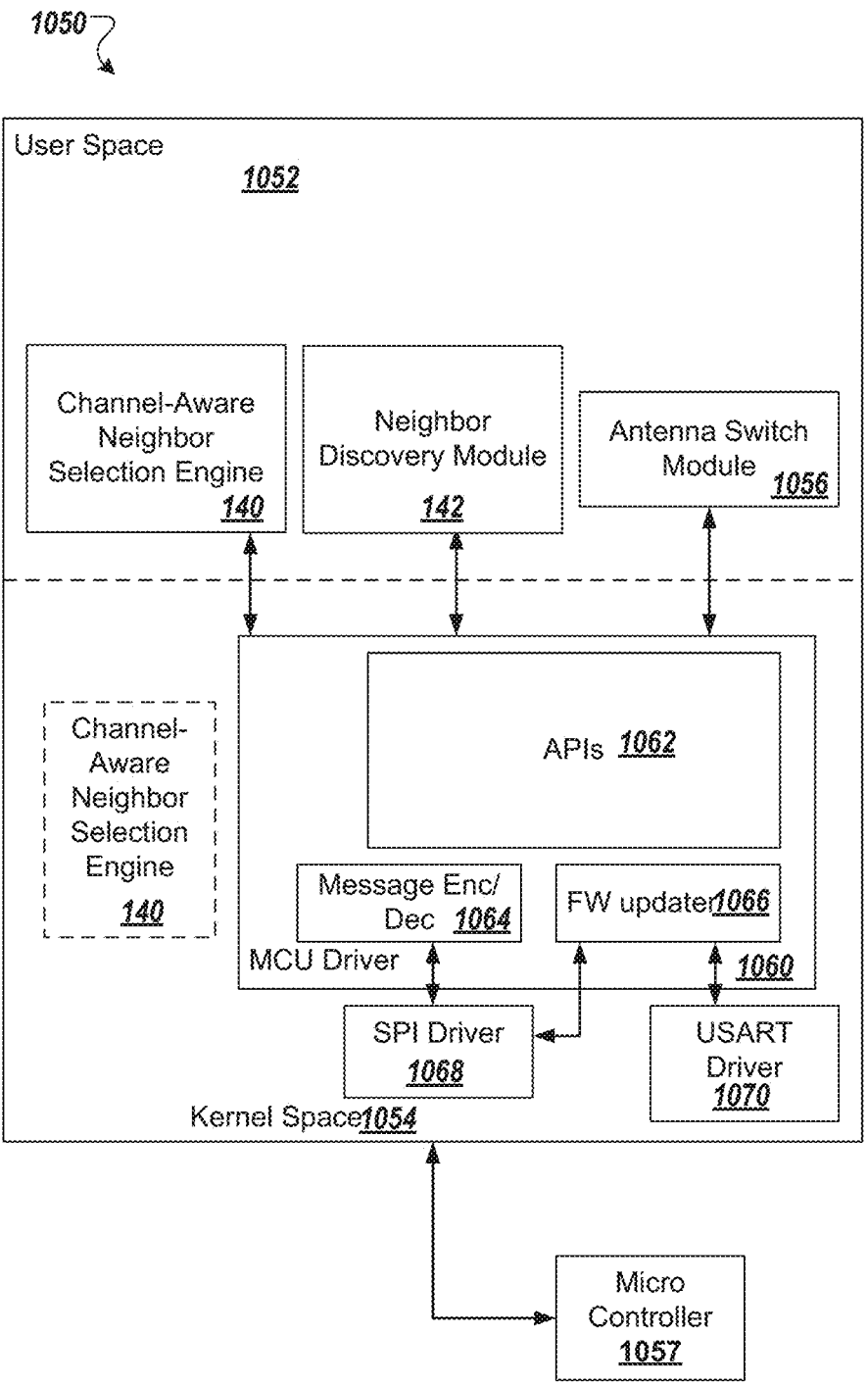
FIG. 10 is a block diagram of an application processor in which the channel-aware neighbor selection manager operating in accordance with embodiments of the present disclosure may be implemented.

FIG. 10 is a block diagram of an application processor in which the channel-aware neighbor selection manager 140 operating in accordance with embodiments of the present disclosure may be implemented. The application processor 1050 executes an operating system that segregates memory (virtual memory) into user space 1052 and kernel space 1054. In this embodiment, a neighbor discovery module 1040 and the channel-aware neighbor selection manager 140 run in the user space 1052. In other embodiments, some or the entire channel-aware neighbor selection manager 140 can be implemented in the kernel space 1054. In other embodiments, some or the entire neighbor discovery module 1040 can be implemented in the kernel space 1054. The channel-aware neighbor selection manager 140 may be instructions that when executed by the application processor 1050 perform various operations as described herein, such as method 600 of FIG. 6 or method 700 of FIG. 7. The neighbor discovery module 1040 may be instructions that when executed by the application processor 1050 perform operations as described herein. The application processor 1150 can communicate with neighbor network devices to route data traffic on a network backbone of multiple P2P wireless connections between the network devices.

In the kernel space 1154, a micro controller unit (MCU) driver 1160 can execute. The MCU driver 1160 may include multiple application programming interfaces (APIs) 1162 to interface to other components, such as the radios and micro controller, as described herein. The APIs 1162 can communicate messages to other components and may use a message encoder/decoder 1164 to encode and decode these messages. The APIs 1162 may include an API for getting firmware versions, an API for updating the firmware, and an API for getting radio information (e.g., radio configuration, antenna configuration, channel information, chamber/sector information, or the like). The MCU driver 1160 may also include a firmware (FW) updater 1166. Also, the kernel space 1154 may include a serial packet interface (SPI) driver 1168 and a Universal Synchronous/Asynchronous Receiver/Transmitter (USART) driver 1170.

In one embodiment, there is an interface mechanism between the user space 1152 and kernel space 1154 that has minimum latency. For example, in cases when there is an invalid configuration being input by an application, such as the channel-aware neighbor selection manager 140, the error should be reported as quickly as possible to the application. The application processor 1150 may also include power management modules in the user space 1152 or in the kernel space 1154 since the application processor 1150 could be operating in a battery-backed operating state during power outages.

Figure 11:
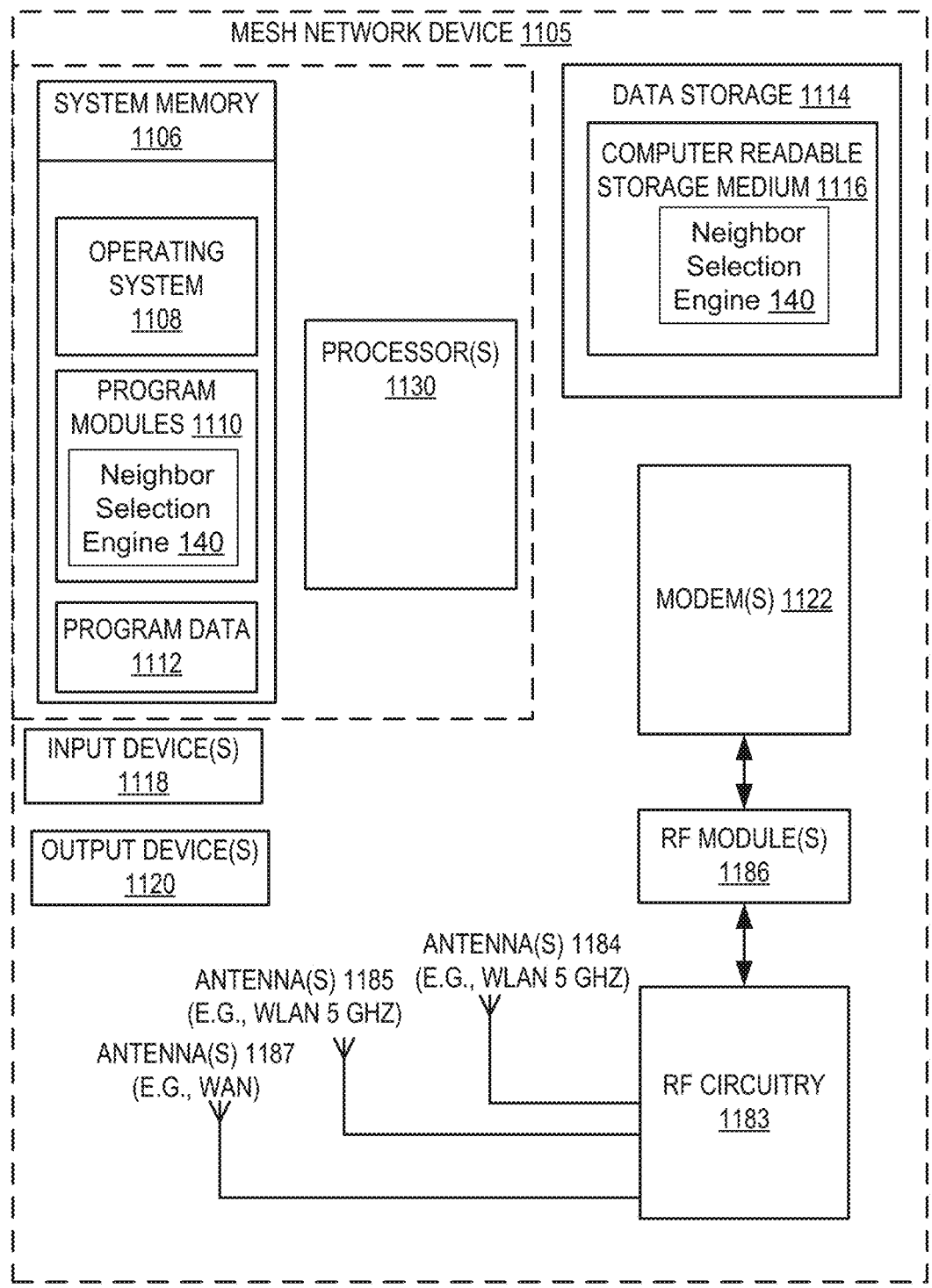
FIG. 11 is a block diagram of a network hardware device with a channel-aware neighbor selection manager according to one embodiment.

FIG. 11 is a block diagram of a network hardware device 1100 with a channel-aware neighbor selection manager 140 according to one embodiment. The network hardware device 1100 may correspond to the network hardware device 102-110 of FIG. 1. In another embodiment, the network hardware device 1100 may correspond to any of the wireless mesh point stations (MP STA) 210A-210Z, mesh access points (MAP) 220A-220K, and mesh portals (MPP) 230A-220M of FIG. 2. In another embodiment, the network hardware device 1100 may correspond to the nodes 401-410 of FIG. 4. In another embodiment, the network hardware device 1100 may correspond to the mesh node 800 of FIG. 8. In another embodiment, the network hardware device 1100 may correspond to the mesh network device 900 of FIG. 9. In another embodiment, the network hardware device 1100 may correspond to the application processor 1050 of FIG. 10. Alternatively, the network hardware device 1100 may be other electronic devices, as described herein.

The network hardware device 1100 includes one or more processor(s) 1130, such as one or more CPUs, microcontrollers, field programmable gate arrays, or other types of processors. The network hardware device 1100 also includes system memory 1106, which may correspond to any combination of volatile and/or non-volatile storage mechanisms. The system memory 1106 stores information that provides operating system component 1108, various program modules 1110, program data 1112, and/or other components. The program modules 1110 may include instructions of the channel-aware neighbor selection manager 140. In one embodiment, the system memory 1106 stores instructions of methods to control operation of the network hardware device 1100. The network hardware device 1100 performs functions by using the processor(s) 1130 to execute instructions provided by the system memory 1106.

The network hardware device 1100 also includes a data storage device 1114 that may be composed of one or more types of removable storage and/or one or more types of non-removable storage. The data storage device 1114 includes a computer-readable storage medium 1116 on which is stored one or more sets of instructions embodying any of the methodologies or functions described herein. Instructions for the program modules 1110 may reside, completely or at least partially, within the computer-readable storage medium 1116, system memory 1106 and/or within the processor(s) 1130 during execution thereof by the network hardware device 1100, the system memory 1106 and the processor(s) 1130 also constituting computer-readable media. The network hardware device 1100 may also include one or more input devices 1118 (keyboard, mouse device, specialized selection keys, etc.) and one or more output devices 1120 (displays, printers, audio output mechanisms, etc.).

The network hardware device 1100 further includes a modem 1122 to allow the network hardware device 1100 to communicate via a wireless connections (e.g., such as provided by the wireless communication system) with other computing devices, such as remote computers, an item providing system, and so forth. The modem 1122 can be connected to one or more RF modules 1186. The RF modules 1186 may be a WLAN module, a WAN module, PAN module, GPS module, or the like. The antenna structures (antenna(s) 1184, 1185, 1187) are coupled to the RF circuitry 1183, which is coupled to the modem 1122. The RF circuitry 1183 may include radio front-end circuitry, antenna switching circuitry, impedance matching circuitry, or the like. In one embodiment, the RF circuitry 1183 includes the RFFE circuitry with high selectivity performance as described in the various embodiments of FIGS. 5-12. The antennas 1184 may be GPS antennas, NFC antennas, other WAN antennas, WLAN or PAN antennas, or the like. The modem 1122 allows the network hardware device 1100 to handle both voice and non-voice communications (such as communications for text messages, multimedia messages, media downloads, web browsing, etc.) with a wireless communication system. The modem 1122 may provide network connectivity using any type of mobile network technology including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 1122 may generate signals and send these signals to antenna(s) 1184 of a first type (e.g., WLAN 5 GHz), antenna(s) 1185 of a second type (e.g., WLAN 2.4 GHz), and/or antenna(s) 1187 of a third type (e.g., WAN), via RF circuitry 1183, and RF module(s) 1186 as descried herein. Antennas 1184, 1185, 1187 may be configured to transmit in different frequency bands and/or using different wireless communication protocols. The antennas 1184, 1185, 1187 may be directional, omnidirectional, or non-directional antennas. In addition to sending data, antennas 1184, 1185, 1187 may also receive data, which is sent to appropriate RF modules connected to the antennas. One of the antennas 1184, 1185, 1187 may be any combination of the antenna structures described herein.

In one embodiment, the network hardware device 1100 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another user device (e.g., via the second connection) at the same time. Alternatively, the two connections may be active concurrently during wireless communications with multiple devices. In one embodiment, the first wireless connection is associated with a first resonant mode of an antenna structure that operates at a first frequency band and the second wireless connection is associated with a second resonant mode of the antenna structure that operates at a second frequency band. In another embodiment, the first wireless connection is associated with a first antenna structure and the second wireless connection is associated with a second antenna. In other embodiments, the first wireless connection may be associated with content distribution within mesh nodes of the WMN and the second wireless connection may be associated with serving a content file to a client consumption device, as described herein.

Though a modem 1122 is shown to control transmission and reception via antenna (1184, 1185, 1187), the network hardware device 1100 may alternatively include multiple modems, each of which is configured to transmit/receive data via a different antenna and/or wireless transmission protocol.

Figure 12:
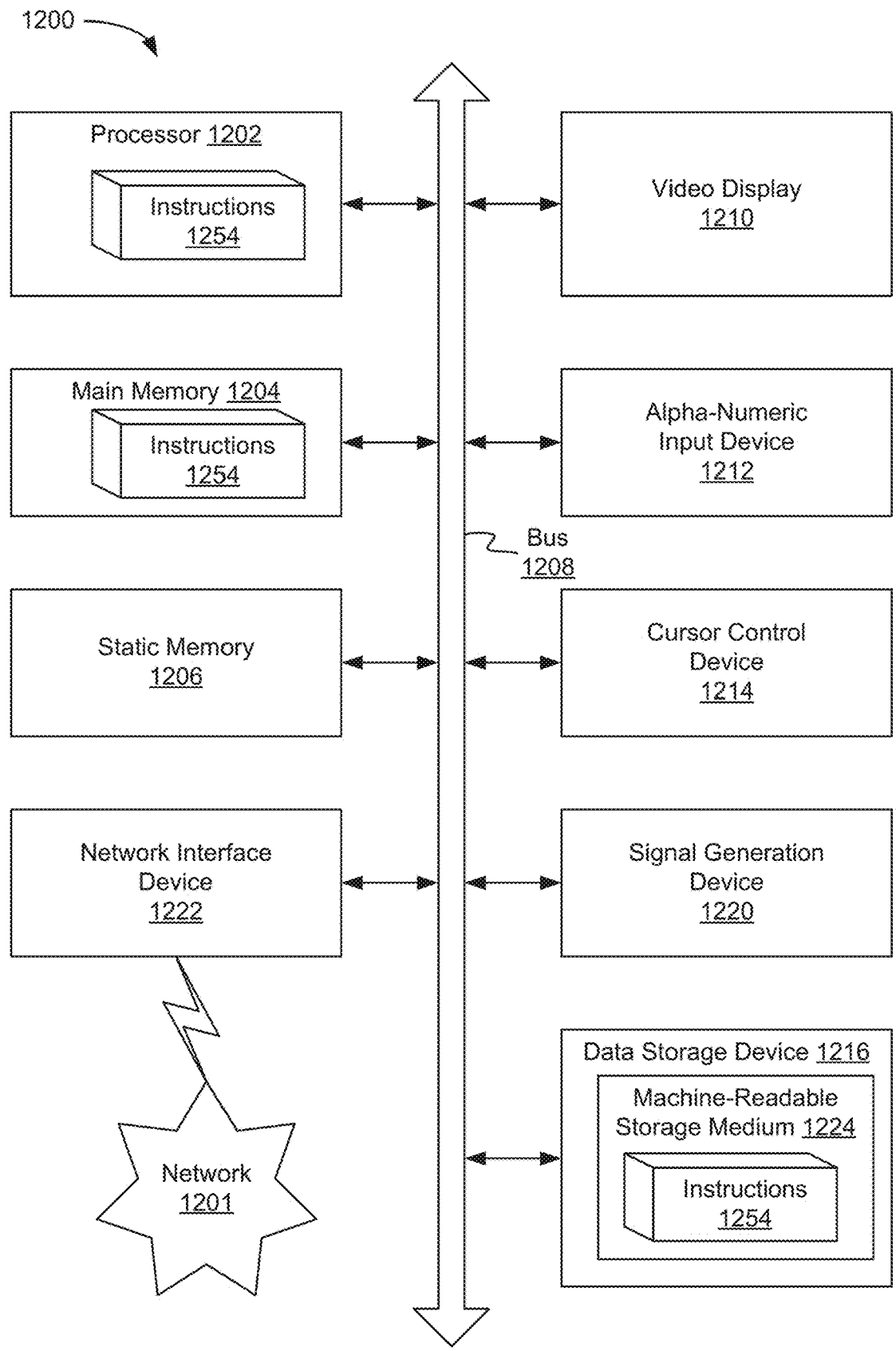
FIG. 12 illustrates a component diagram of a computer system which may implement one or more methods of channel-aware neighbor selection described herein.

FIG. 12 illustrates a component diagram of a computer system which may implement one or more methods of channel-aware neighbor selection described herein. A set of instructions for causing the computer system 1200 to perform any one or more of the methods discussed herein may be executed by the computer system 1200. In one embodiment, the computer system 1200 may implement the functions of the mesh network control service 125 of FIG. 1. Alternatively, the computer system 1200 may implement functions of the channel-aware neighbor selection manager 140 in a central entity.

In one embodiment, the computer system 1200 may be connected to other computer systems by a network 1201 provided by a Local Area Network (LAN), an intranet, an extranet, the Internet or any combination thereof. The computer system may operate in a collection of one or more computers to implement a cloud computing system. The computer system may operate in the capacity of a server or a client machine in a client-server network environment or as a peer machine in a peer-to-peer (or distributed) network environment. The computer system may be a personal computer (PC), a tablet PC, a set-top box (STB), a Personal Digital Assistant (PDA), a cellular telephone, a web appliance, a server, a network router, switch, bridge or any machine capable of executing a set of instructions (sequential or otherwise) that specify actions to be taken by that machine. Further, while a single machine is illustrated, the term "computer system" shall also be taken to include any collection of machines (e.g., computers) that individually or jointly execute a set (or multiple sets) of instructions to perform any one or more of the methodologies discussed herein.

In one embodiment, the computer system 1200 includes a processing device 1202, a main memory 1204 (e.g., read-only memory (ROM), flash memory, dynamic random access memory (DRAM) such as synchronous DRAM (SDRAM), etc.), a static memory 1206 (e.g., flash memory, static random access memory (SRAM), etc.) and a data storage device 1216, which communicate with each other via a bus 1208.

In one embodiment, the processing device 1202 represents one or more general-purpose processors such as a microprocessor, central processing unit or the like. Processing device may include any combination of one or more integrated circuits and/or packages that may, in turn, include one or more processors (e.g., one or more processor cores). Therefore, the term processing device encompasses a single core CPU, a multi-core CPU and a massively multi-core system that includes many interconnected integrated circuits, each of which may include multiple processor cores. The processing device 1202 may therefore include multiple processors. The processing device 1202 may include a complex instruction set computing (CISC) microprocessor, reduced instruction set computing (RISC) microprocessor, very long instruction word (VLIW) microprocessor, processor implementing other instruction sets or processors implementing a combination of instruction sets. The processing device 1202 may also be one or more special-purpose processing devices such as an application specific integrated circuit (ASIC), a field programmable gate array (FPGA), a digital signal processor (DSP), network processor or the like.

In one embodiment, the computer system 1200 may further include one or more network interface devices 1222. The computer system 1200 also may include a video display unit 1210 (e.g., a liquid crystal display (LCD) or a cathode ray tube (CRT)), an alphanumeric input device 1212 (e.g., a keyboard), a cursor control device 1214 (e.g., a mouse) and a signal generation device 1220 (e.g., a speaker).

In one embodiment, the data storage device 1218 may include a computer-readable storage medium 1224 on which is stored one or more sets of instructions 1254 embodying any one or more of the methods or functions described herein. The instructions 1254 may also reside, completely or at least partially, within the main memory 1204 and/or within the processing device 1202 during execution thereof by the computer system 1200; the main memory 1204 and the processing device 1202 also constituting machine-readable storage media.

While the computer-readable storage medium 1224 is shown as a single medium, the term "computer-readable storage medium" should be taken to include a single medium or multiple media (e.g., a centralized or distributed database and associated caches and servers) that store the one or more sets of instructions. The term "computer-readable storage medium" shall also be taken to include any medium that is capable of storing, encoding, or carrying a set of instructions for execution by the machine and that cause the machine to perform any one or more of the methods described herein. Examples of computer-readable storage media include, but not limited to, solid-state memories, optical media, and magnetic media.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "inducing," "parasitically inducing," "radiating," "detecting," "determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A method comprising:
   receiving, by a first mesh network device, first data from a second mesh network device, the first data comprising a first receive signal strength indicator (RSSI) value, a first identifier that identifies an antenna of the second mesh network device, and a first unused channel list of the second mesh network device;
   receiving, by the first mesh network device, second data from a third mesh network device, the second data comprising a second RSSI value, a second identifier that identifies an antenna of the third mesh network device, and a second unused channel list of the third mesh network device;
   determining, using the first data and the second data, a first set of radio channels of the first mesh network device, each radio channel of the first set being assigned to a communication link between the first mesh network device and another mesh network device;
   determining, using the first data and the second data, a second set of radio channels of the first mesh network device, each radio channel of the second set being assigned to a communication link between the first mesh network device and another mesh network device;
   determining that a first connectivity-quality metric value of the second set of radio channels is higher than a second connectivity-quality metric value of the first set of radio channels; and
   sending a message to each mesh network device associated with the second set of radio channels, the message requesting to establish a communication link between the first mesh network device and the respective mesh network device.

2. The method of claim 1, further comprising
   generating a first link-conflict map for the first set of radio channels, the first link-conflict map indicates a first number of channels in the first set of radio channels that conflicts with an existing communication link assigned to a same radio channel, the existing communication link traversing less than or equal to two hops from the first mesh network device;
   generating a second link-conflict map for the second set of radio channels, the second link-conflict map indicates a second number of channels in the second set of radio channels that conflicts with an existing communication link assigned to a same radio channel, the existing communication link traversing less than or equal to two hops from the first mesh network device; and
   selecting, using the first link-conflict map and the second link-conflict map, a set of radio channels having a least number of conflicts from the first set of radio channels and the second set of radio channels.

3. The method of claim 1, wherein determining the first set of radio channels comprises performing a first depth-first-search (DFS) traversal of a data structure comprising the first data and the second data to obtain the first set of radio channels, and wherein determining the second set of radio channels comprises performing a second DFS traversal of the data structure to obtain the second set of radio channels.

4. The method of claim 1, further comprising:
   computing a first connectivity-quality metric value for the first set of radio channels;
   computing a second connectivity-quality metric value for the second set of radio channels,
   wherein computing the first connectivity-quality metric value comprises:
      assigning a weighting value to each of the RSSI values in the first set of radio channels to obtain first weighted values, a first weighting value for the highest RSSI value being greater than a second weighting value for at least one of the other RSSI values;
      summing the first weighted values to obtain a first weighted sum corresponding to the first connectivity-quality metric value.

5. The method of claim 4, further comprises:
   subtracting a first value from the respective one of the RSSI values associated with the first set of radio channels to obtain a first result, wherein the first value is a minimum RSSI value for establishing a communication link between two mesh network devices;
   subtracting the first value from a second value to obtain a second result, wherein the second value is a maximum RSSI value for establishing a communication link between two mesh network devices; and
   dividing the first result by the second result to obtain the weighting value.

6. The method of claim 1, further comprising, during a neighbor discovery process:
   i) receiving, via a fifth radio of the first mesh network device, a 2.4 GHz beacon frame, the 2.4 GHz beacon frame including a first informational element identifying the second mesh network device, the third mesh network device, or a fourth mesh network device;
   ii) monitoring, for a time period, each radio channel for each of a first radio, a second radio, and a third radio of the first mesh network device;
   iii) after steps ii), receiving, via the first radio, a 5 GHz mesh frame from the second mesh network device, the third mesh network device, or the fourth mesh network device, the 5 GHz mesh frame including an identifier (ID);
   iv) determining a mesh network device identifier that identifies the second mesh network device, the third mesh network device, or the fourth mesh network device and a sector identifier that identifies a source antenna from which the 5 GHz mesh frame was transmitted, a first RSSI value corresponding to the 5 GHz mesh frame, an unused radio of the second mesh network device, the third mesh network device, or the fourth mesh network device, and an unused radio channel of the unused radio; and
   v) sending a discovery request frame to the unused radio on the unused radio channel via each of the first radio, the second radio, and the third radio, wherein during ii) and v), the first radio is selectively coupled to a first one of a plurality of directional antennas of the first mesh network device, the second radio is selectively coupled to a second one of the plurality of directional antennas, and the third radio is selectively coupled to a third one of the plurality of directional antennas.

7. The method of claim 1, further comprising:
i) sending a first request to the third mesh network device via a first radio of the first mesh network device to pair the first mesh network device to the third the mesh network device, wherein the third mesh network device has a highest RSSI value than the first mesh network device and the second mesh network device, the first request comprising:
   (1) a source sector identifier that identifies a source antenna at the first mesh network device,
   (2) a destination sector identifier that identifies a destination antenna at the third mesh network device,
   (3) a radio channel identifier that identifies which of a first radio channel, a second radio channel, a third radio channel, or a fourth radio channel of the first radio,
   (4) a media access control (MAC) address of the first radio of the first mesh network device, and
   (5) a radio configuration table for the first mesh network device;
ii) receiving a first response from the third mesh network device via the first radio, first response confirming establishment of a communication link between the first radio of the first mesh network device and a first radio of the third mesh network device; and
iii) repeating steps i) and ii) for the fourth mesh network device for a second radio of the first mesh network device, wherein the fourth mesh network device has a higher RSSI value than the second mesh network device.

8. A method comprising:
receiving, by a first mesh network device, first data from a second mesh network device, the first data comprising a first receive signal strength indicator (RSSI) value, a first identifier that identifies an antenna of the second mesh network device, and a first unused channel list of the second mesh network device;
receiving, by the first mesh network device, second data from a third mesh network device, the second data comprising a second RSSI value, a second identifier that identifies an antenna of the third mesh network device, and a second unused channel list of the third mesh network device;
determining, using the first data and the second data, a first set of radio channels of the first mesh network device, each radio channel of the first set being assigned to a communication link between the first mesh network device and another mesh network device;
determining, using the first data and the second data, a second set of radio channels of the first mesh network device, each radio channel of the second set being assigned to a communication link between the first mesh network device and another mesh network device;
generating a first mapping for the first set of radio channels, the first mapping indicating a first number of channels in the first set of radio channels that conflict with an existing communication link assigned to a same radio channel, the existing communication link traversing less than or equal to two hops from the first mesh network device;
generating a second mapping for the second set of radio channels, the second mapping indicating a second number of channels in the second set of radio channels that conflict with an existing communication link assigned to a same radio channel, the existing communication link traversing less than or equal to two hops from the first mesh network device; and
sending a request to each mesh network device associated with the first set radio channels or the second set of radio channels to pair the first mesh network device and the respective mesh network device.

9. The method of claim 8, further comprising:
computing a first connectivity-quality metric value for the first set of radio channels;
computing a second connectivity-quality metric value for the second set of radio channels;
comparing the first connectivity-quality metric value and the second connectivity-quality metric value; and
determining which of the first mapping or the second mapping has a least number of conflicts, wherein selecting one of the first set or the second set of radio channels comprises:
   selecting one of the first set or the second set of radio channels with a highest connectivity-quality metric value; or
   selecting one of the first set or the second set of radio channels with the least number of conflicts.

10. The method of claim 9, wherein computing the first connectivity-quality metric value comprises:
assigning a weighting value to each of the RSSI values in the first set of radio channels to obtain first weighted values, a first weighting value for the highest RSSI value being greater than a second weighting value for at least one of the other RSSI values; and
summing the first weighted values to obtain a first weighted sum corresponding to the first connectivity-quality metric value.

11. The method of claim 10, further comprises:
subtracting a first value from the respective one of the RSSI values associated with the first set of radio channels to obtain a first result, wherein the first value is a minimum RSSI value for establishing a communication link between two mesh network devices;
subtracting the first value from a second value to obtain a second result, wherein the second value is a maximum RSSI value for establishing a communication link between two mesh network devices;
dividing the first result by the second result to obtain the weighting value.

12. The method of claim 8, wherein determining the first set of radio channels comprises performing a first depth-first-search (DFS) traversal of a data structure comprising the first data and the second data to obtain the first set of radio channels, and wherein determining the second set of radio channels comprises performing a second DFS traversal of the data structure to obtain the second set of radio channels.

13. The method of claim 8, further comprising, during a neighbor discovery process:
i) receiving, via a fifth radio of the first mesh network device, a 2.4 GHz beacon frame, the 2.4 GHz beacon frame including a first informational element identifying one of the second mesh network device, the third mesh network device, or a fourth mesh network device;
ii) monitoring, for a time period, each radio channel of each of a first radio, a second radio, and a third radio of the first mesh network device;
iii) after steps ii), receiving, via the first radio, a 5 GHz mesh frame from the one of the second mesh network device, the third mesh network device, or the fourth mesh network device, the 5 GHz mesh frame including an identifier (ID);
iv) determining a mesh network device identifier that identifies the one of the second mesh network device, the third mesh network device, or the fourth mesh network device and a sector identifier that identifies a source antenna from which the 5 GHz mesh frame was transmitted, a first RSSI value corresponding to the 5 GHz mesh frame, an unused radio of the one of the second mesh network device, the third mesh network device, or the fourth mesh network device, and an unused radio channel of the unused radio; and
v) sending a discovery request frame to the unused radio on the unused radio channel via each of the first radio, the second radio, and the third radio, wherein during ii) and v), the first radio is selectively coupled to a first one of a plurality of directional antennas of the first mesh network device, the second radio is selectively coupled to a second one of the plurality of directional antennas, and the third radio is selectively coupled to a third one of the plurality of directional antennas.

14. The method of claim 8, further comprising:
i) sending a first request to the third mesh network device via a first radio of the first mesh network device to pair the first mesh network device to the third mesh network device, wherein the third mesh network device has a highest RSSI value than the first mesh network device and the second mesh network device, the first request comprising:
  (1) a source sector identifier that identifies a source antenna at the first mesh network device,
  (2) a destination sector identifier that identifies a destination antenna at the third mesh network device,
  (3) a radio channel identifier that identifies which of a first radio channel, a second radio channel, a third radio channel, or a fourth radio channel of the first radio,
  (4) a media access control (MAC) address of the first radio of the first mesh network device, and
  (5) a radio configuration table for the first mesh network device;
ii) receiving a first response from the third mesh network device via the first radio, first response confirming establishment of a communication link between the first radio of the first mesh network device and a first radio of the third mesh network device; and
iii) repeating steps i) and ii) for a fourth mesh network device for a second radio of the first mesh network device, wherein the fourth mesh network device has a higher RSSI value than the second mesh network device.

15. The method of claim 8, further comprising generating a probed sector table comprising an entry for each of a plurality of directional antennas indexed by sector identifiers, a first entry associated with a first directional antenna of the plurality of direction antennas containing: a sector identifier that identifies a respective one of the plurality of directional antennas; a RSSI value associated with a first neighbor-sector identifier that identifies another mesh network device and an antenna of the another mesh network device; and an unused channel list of the another mesh network device.

16. The method of claim 15, wherein the probed sector table is sorted according to an order of descending RSSI values.

17. The method of claim 8, further comprising:
generating a first link-conflict map for the first set of radio channels, the first link-conflict map comprising the first mapping for the first set of radio channels; and
generating a second link-conflict map for the second set of radio channels, the second link-conflict mapping comprising the second mapping for the second set of radio channels.

* * * * *